(12) United States Patent
Yoon et al.

(10) Patent No.: US 10,222,276 B2
(45) Date of Patent: Mar. 5, 2019

(54) SYSTEM AND METHOD FOR CONTROLLING TEMPERATURE OF USER

(71) Applicant: SK PLANET CO., LTD., Seongnam-si, Gyeonggi-do (KR)

(72) Inventors: Sunghyun Yoon, Seoul (KR); Han Sung Gwac, Uiwang-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 78 days.

(21) Appl. No.: 15/331,919

(22) Filed: Oct. 24, 2016

(65) Prior Publication Data
US 2017/0122655 A1 May 4, 2017

(30) Foreign Application Priority Data

Oct. 28, 2015 (KR) .................. 10-2015-0150320
Oct. 28, 2015 (KR) .................. 10-2015-0150321

(51) Int. Cl.
| | |
|---|---|
| *G01K 13/00* | (2006.01) |
| *G01K 3/08* | (2006.01) |
| *G01J 1/42* | (2006.01) |

(52) U.S. Cl.
CPC ............ *G01K 13/002* (2013.01); *G01J 1/429* (2013.01); *G01K 3/08* (2013.01); *G05B 2219/2614* (2013.01)

(58) Field of Classification Search
CPC .............................. G01K 13/002; G01K 13/08
USPC ....................................................... 340/573.1
See application file for complete search history.

(56) References Cited

U.S. PATENT DOCUMENTS

| | | | | |
|---|---|---|---|---|
| 2010/0006660 A1* | 1/2010 | Leen | .................. | G05D 23/1931 236/51 |
| 2013/0297081 A1* | 11/2013 | Kawai | .................... | G08C 17/02 700/276 |
| 2014/0279571 A1* | 9/2014 | Cox | ........................ | G06Q 10/20 705/305 |
| 2014/0298859 A1* | 10/2014 | Balboni | ................. | G01K 1/024 63/1.13 |
| 2014/0358291 A1* | 12/2014 | Wells | ................. | G05D 23/1902 700/276 |
| 2015/0019024 A1* | 1/2015 | Sabripour | .......... | G05D 23/1927 700/276 |
| 2015/0348049 A1* | 12/2015 | Todasco | ................. | G06Q 10/02 705/5 |

(Continued)

FOREIGN PATENT DOCUMENTS

| | | |
|---|---|---|
| KR | 10-1999-0041269 A | 6/1999 |
| KR | 10-1501280 B1 | 12/2013 |

*Primary Examiner* — Omar Casillashernandez
(74) *Attorney, Agent, or Firm* — Brinks Gilson & Lione

(57) ABSTRACT

Disclosed herein are a system and method for controlling the temperature of a user. The wearable device may include a first temperature measurement unit configured to measure a temperature of a user and a control unit configured to calculate a temperature difference by comparing the temperature measured by the first temperature measurement unit with a previously stored temperature of the user at normal times, provide temperature measurement information to an external device if the calculated temperature difference is more than a reference temperature difference for a predetermined time, and receive service information for controlling the temperature of the user based on the temperature measurement information from the external device.

9 Claims, 19 Drawing Sheets

(56) References Cited

U.S. PATENT DOCUMENTS

| | | | |
|---|---|---|---|
| 2016/0209074 A1* | 7/2016 | Ito | F24F 11/02 |
| 2017/0039599 A1* | 2/2017 | Tunnell | G06Q 30/0255 |
| 2017/0061404 A1* | 3/2017 | Tunnell | G06Q 30/0255 |
| 2017/0076263 A1* | 3/2017 | Bentz | H04W 4/80 |
| 2017/0192402 A1* | 7/2017 | Karp | F24F 11/30 |

* cited by examiner

SYSTEM AND METHOD FOR CONTROLLING TEMPERATURE OF USER

CROSS REFERENCE TO RELATED APPLICATION

The present application claims the benefit of Korean Patent Application No. 10-2015-0150321 filed in the Korean Intellectual Property Office on Oct. 28, 2015 and Korean Patent Application No. 10-2015-0150320 filed in the Korean Intellectual Property Office on Oct. 28, 2015, the entire contents of which are incorporated herein by reference.

BACKGROUND OF THE INVENTION

1. Technical Field

The present invention relates to a system and method for controlling the temperature of a user and, more particularly, to a system and method for controlling the temperature of a user, which provide service information for automatically controlling the temperature of an air-conditioning control device at a place where a user is located or for controlling body temperature in a store where food for control of body temperature is sold when a difference between the current temperature of the user and a temperature of the user at normal times is more than a reference temperature difference.

2. Description of the Related Art

A wearable device literally refers to a device which may be worn on the human body, and includes various types of devices, such as glasses, a watch, a bracelet, shoes, a ring, a belt, a band, a necklace, a headset, and clothing, depending on a part on which the device is worn. Today, such a wearable device is coming into wide use. From among the wearable devices, the wearable glasses, the wearable watch, and the wearable band which are very closely related to the human life and can be easily worn form the most product group.

The wearable device is also called a smart device. The reason for this is that the wearable device needs to be initially driven by user input, but once the wearable device is driven, it can automatically generate various types of additional information and provide them to a user. For example, if a user who has worn a wearable watch wants to measure his or her own heart rate, the wearable watch can measure the heart rate of the user as soon as the user presses a heart rate measurement input button, can generate various types of information based on the measured heart rate, and can provide them to the user. Recently, many wearable devices that do not need to be initially driven by user input are appearing. For example, a wearable band can continue to measure the heart rate of a user although it is not initially driven by user input. In the future, there is a very good possibility that a wearable device will be developed in such a way not to be initially driven by user input. The reason for this is that convenience in device driving is improved if user input is not required.

The origin of various types of additional information provided from such a wearable device to a user includes pieces of information measured from the user. Accordingly, sensors for measuring various types of information from a user need to be mounted on a wearable device. The more the type of sensor is increased, the more information is measured from a user. Accordingly, a heart rate measurement sensor, a Global Positioning System (GPS) sensor and/or a number-of-steps measurement sensor tend to be essentially mounted on a recent wearable device. Research continues to be carried out to dispose various sensors in a limited space within a wearable device.

A wearable device can measure information from a user through sensors mounted thereon, can generate various types of additional information based on the measured information, and can provide them to the user. For example, the current location of a user may be measured, and information about a nearby store or commodities related to a matter of concern of the user may be provided to the user. Such additional information may be provided through a function embedded in a wearable device itself, but it is impossible for a single wearable device to provide all pieces of additional information to different users. Accordingly, recently, an application installed on a wearable device is also developed. In this case, the application may be considered to be a kind of application program, and may function to generate various types of additional information based on information measured through a function embedded in a wearable device itself and to provide them. In the above example, the provision of information about a nearby store or commodities related to a matter of concern of a user can be provided by an application. That is, whenever a new application is developed, additional information which may be provided to a user through a wearable device is inevitably diversified. The development of an application may be considered to be a companion that steps forward along with the development of a wearable device itself.

A wearable device for measuring the temperature of a user and displaying the measured body temperature is known.

However, a conventional wearable device only measures and displays the temperature of a user and does not provide a service for controlling the temperature of a user.

PRIOR ART DOCUMENT

Patent Document (Patent Document 1) Prior Art 1: Korean Patent Application Publication No. 1999-0041269 entitled "HEALTH CARE TIMEPIECE, ESPECIALLY FOR ENABLING IDENTIFYING PHYSICAL CONDITION OF CUSTOMERS"

SUMMARY OF THE INVENTION

An embodiment of the present invention is directed to the provision of a system and method, which can provide a service capable of controlling the temperature of a user using a wearable device when a difference between a measured temperature of a user and a temperature of the user at normal times is great.

An embodiment of the present invention is directed to the provision of a wearable device which can measure the temperature of a user and an external temperature at the same time.

An embodiment of the present invention is directed to the provision of a system and method for controlling the temperature of a user, which can sense the temperature of a user and a change in the temperature of the user attributable to an external temperature and can provide a service for automatically controlling the temperature of an air-conditioning control device or controlling the temperature of the user depending on the location of the user.

An embodiment of the present invention is directed to the provision of a system and method for controlling the temperature of a user, which can sense a change in the temperature of a user, can determine whether the changed temperature is a comfortable temperature of the user in real time, and can automatically control the temperature of an air-conditioning control device in a place where the user is located.

An embodiment of the present invention is directed to the provision of a system and method for controlling the temperature of a user, which can compare the current temperature pattern of a user with the temperature pattern of the user at normal times and can provide the user with a coupon service and information about a store near the user, which may be necessary for the user in a corresponding situation, in order to induce the user to purchase a commodity if, as a result of the comparison, a change in the temperature of the user is great.

An embodiment of the present invention is directed to the proposal of a system capable of solving problems, such as rapidness and convenience, by providing a skin care service through a wearable device and also providing a more efficient service to users in association with a digital content providing service and a method using the system.

An embodiment of the present invention is directed to the provision of a skin care service using the data of the intensity of ultraviolet rays measured by the wearable device of a user at the current location of the user.

An embodiment of the present invention is directed to providing a service associated with digital content in real time using skin care information.

An embodiment of the present invention is directed to providing a service for giving warning to a user in real time based on skin care information when a UV danger index is reached.

Technical objects of the present invention are not limited to the aforementioned objects, and those skilled in the art will clearly understand other technical objects not described above from the following description.

In accordance with an aspect of the present invention, there is provided a wearable device for a service for controlling a temperature of a user, including a first temperature measurement unit configured to measure a temperature of a user and a control unit configured to calculate a temperature difference by comparing the temperature measured by the first temperature measurement unit with a previously stored temperature of the user at normal times, provide temperature measurement information to an external device if the calculated temperature difference is more than a reference temperature difference for a predetermined time, and receive service information for controlling the temperature of the user based on the temperature measurement information from the external device.

The wearable device may further include a second temperature measurement unit configured to measure an external temperature and a display unit configured to display at least one of the temperature measured by the first temperature measurement unit, the external temperature measured by the second temperature measurement unit, the temperature difference, the reference temperature difference, and the service information for controlling the temperature of the user.

The temperature of the user at normal times may be a temperature at normal times which is the external temperature measured by the second temperature measurement unit.

When an air-conditioning control device is sensed through short-range communication, the control unit may transmit the temperature measurement information to the sensed air-conditioning control device, may receive a question about whether a current temperature is proper from the air-conditioning control device, and may return a response to the question.

Furthermore, when an air-conditioning control device is not sensed through short-range communication, the control unit may transmit the temperature measurement information to a service server and may receive the service information for controlling the temperature of the user based on information about the location and temperature of the user from the service server.

The temperature measurement information may include at least one of the measured temperature, an external temperature, the temperature difference, and information about the location of the user.

In accordance with another aspect of the present invention, there is provided a service server for a service for controlling a temperature of a user, including a communication unit configured to communicate with a wearable device over a communication network and a personalized service unit configured to generate service information for controlling a temperature of a user based on information about the location and temperature of the user when receiving temperature measurement information including the location information and the temperature information through the communication unit and provide the service information to the wearable device.

If an air-conditioning control device is present in the location information, the personalized service unit may transmit a question about whether the current temperature of the air-conditioning control device is proper to the wearable device and may control the temperature of the air-conditioning control device based on a response from the wearable device.

Furthermore, the personalized service unit may check stores located in a short distance from the location of the user, may extract stores that belong to the checked stores and that provide a service for controlling the temperature of the user, and may generate service information for controlling the temperature of the user, which includes at least one of pieces of information about food, a coupon, and a point provided by the extracted stores.

The service server may further include a database configured to store store-related information including at least one of pieces of information about a store name, a store location, a commodity, a coupon, and a point.

In accordance with an aspect of the present invention, there is provided a system for providing a skin care service using a wearable device, including a wearable device configured to confirm whether a user is located indoors or outdoors, measure intensity of ultraviolet rays at the confirmed location of the user, transmit data regarding the measured intensity of ultraviolet rays and information about the skin state of the user to a skin care service providing apparatus, receive skin care information from the skin care service providing apparatus, and display the received skin care information on a screen, the skin care service providing apparatus configured to receive the data regarding the intensity of ultraviolet rays based on the current location of the user from the wearable device and the information about the skin state of the user, generate the skin care information using the received information, and transmit the generated skin care information to the wearable device, and a content providing server configured to transmit the digital content of a skin care product or service recorded on the skin care information received from the skin care service providing apparatus to the wearable device.

The system for providing a skin care service using a wearable device may further include a membership interlocking apparatus configured to perform authentication on the user based on authentication information received from the content providing server, transmit subscription information about the user to the content providing server if, as a result of the authentication, the user is found to be a membership subscriber, and transmit a membership subscription request message to the content providing server and the wearable device if, as a result of the authentication, the user is found to be not a membership subscriber.

The wearable device according to an embodiment of the present invention may include a UV intensity measurement sensor configured to measure the intensity of ultraviolet rays at the location of the user, a data transmission unit configured to transmit the data regarding the intensity of ultraviolet rays measured by the UV intensity measurement sensor and the information about the skin state of the user to the skin care service providing apparatus, a data reception unit configured to receive the skin care information based on the intensity of ultraviolet rays from the skin care service providing apparatus, and a display unit configured to display the skin care information received by the data reception unit on a screen.

The data reception unit may further receive the digital content received from the content providing server, and the display unit may display the digital content received by the data reception unit on a screen.

The wearable device according to an embodiment of the present invention may further include a skin state information input unit configured to receive hospital treatment information about the skin state of the user or information about the current skin state according to self-diagnosis. In this case, the skin state information input unit may be paired with another terminal and may receive information.

The data transmission unit may also transfer the information about the skin state of the user to the skin care service providing apparatus.

The wearable device according to an embodiment of the present invention may further include a user location confirmation unit configured to confirm whether the user is located indoors or outdoors. The ultraviolet intensity measurement sensor may measure the intensity of ultraviolet rays only when the user location confirmation unit confirms that the user has been located outdoors.

In accordance with an aspect of the present invention, there is provided a skin care service providing apparatus, including a data reception unit configured to receive data regarding intensity of ultraviolet rays based on the current location of a user from a wearable device, a database configured to store the data regarding the intensity of ultraviolet rays, a skin care information providing module configured to provide skin care information using the data of the intensity of ultraviolet rays stored in the database, and a data transmission unit configured to transmit the skin care information provided by the skin care information providing module to the wearable device.

The data reception unit may further receive information about the skin state of the user. The database may further store the information about the skin state of the user. The skin care information providing module may provide the skin care information further using the information about the skin state of the user.

The data transmission unit may further transfer the skin care information, provided by the skin care information providing module, to a content providing server.

In this case, the skin care information providing module may include a ultraviolet (UV) index calculation unit configured to calculate a UV index value using the data of the intensity of ultraviolet rays stored in the database, a UV danger index determination unit configured to determine whether the UV index value calculated by the UV index calculation unit corresponds to a predetermined danger index, and a UV danger index warning information generation unit configured to generate UV danger index warning information if the UV danger index determination unit determines that the UV index value corresponds to the predetermined danger index.

In this case, the skin care information providing module may further include a skin care commodity information providing unit configured to provide information about a skin care commodity based on the UV index value calculated by the UV index calculation unit.

Furthermore, the skin care commodity information providing unit may provide the information about the skin care commodity by further considering the information about the skin state of the user.

In this case, the skin care information may include at least one of the UV index value, the UV danger index warning information, and information about the skin care product or service.

The content providing server according to an embodiment of the present invention includes a skin care information reception unit configured to receive the skin care information from the skin care service providing apparatus, a digital content providing unit configured to transmit the digital content of a skin care product or service, recorded on the skin care information received from the skin care information reception unit, to a digital content transmission unit, and the digital content transmission unit configured to transfer the digital content received from the digital content providing unit to the wearable device.

The content providing server according to an embodiment of the present invention may further include an authentication information transmission unit configured to send authentication information for confirming whether the user has joined the membership of an affiliated company or skin care service providing company related to the digital content, transmitted from the digital content providing unit to the wearable device, to a membership interlocking device.

The membership interlocking device according to an embodiment of the present invention includes a membership subscriber authentication execution unit configured to perform authentication on the user based on the authentication information received from the content providing server, a membership subscription information transmission unit configured to transmit subscription information about the user to the content providing server if, as a result of the authentication of the authentication execution unit, the user is found to be a membership subscriber, a subscription request transmission unit configured to transmit a membership subscription request message to the wearable device if, as a result of the authentication of the authentication execution unit, the user is found to be not a membership subscriber, and a subscription approval message reception unit configured to receive a subscription approval message for a subscription request message transmitted by the wearable device.

In accordance with an aspect of the present invention, there is provided a method for providing, by a system for providing a skin care service, a skin care service, including the steps of (1) transmitting, by a wearable device, data regarding intensity of ultraviolet rays measured by an ultraviolet measurement sensor and hospital treatment information about skin or information about the current skin state according to self-diagnosis, which has been inputted by a user, to a skin care service providing apparatus, (2) generating, by the skin care service providing apparatus, skin care information using the data of the intensity of ultraviolet rays and the hospital treatment information about skin or the information about the current skin state according to self-diagnosis inputted by the user, which have been received at step (1), (3) transferring, by the skin care service providing apparatus, the skin care information generated at step (2) to a content providing server or the wearable device, and (4) transmitting, by the content providing server, digital content to the wearable device based on the skin care information transferred at step (3).

The method for providing, by a system for providing a skin care service, a skin care service may further include the steps of (a) performing, by a membership interlocking apparatus, authentication for confirming whether the user has joined the membership of a digital content providing affiliated company using user authentication information received from the content providing server, (b) transmitting, by the membership interlocking apparatus, subscription information about the user to the content providing server if, as a result of the authentication at step (a), the user is found to be a membership subscriber and transmitting a membership subscription request message to the content providing server and the wearable device if, as a result of the authentication at step (a), the user is found to be not a membership subscriber, and (c) transferring the subscription information of the membership subscriber to the content providing server when a subscription approval message for the membership subscription request message transmitted at step (b) is received from the wearable device, between step (4) and step (3).

In accordance with an aspect of the present invention, there is provided a method for providing, by a content providing server, a skin care service, including (1) a skin care information reception step for receiving skin care information from a skin care service providing apparatus, (2) a digital content providing step for transmitting the digital content of a skin care product or service recorded on a skin care information received at step (1) to a digital content transmission unit, and (3) a digital content transmission step for transferring the digital content transmitted at step (2) to a wearable device.

The method for providing, by a content providing server, a skin care service, may further include an authentication information transmission step for transmitting authentication information for confirming whether a user has joined the membership of an affiliated company or a skin care service providing company related to the digital content to the membership interlocking apparatus between step (3) and step (2).

In accordance with an aspect of the present invention, there is provided a method for providing, by a membership interlocking device, a skin care service, including (1) a membership subscriber authentication execution step for performing authentication on a user based on authentication information received from a content providing server, (2) a step for transmitting membership subscription information about the user to the content providing server if, as a result of the authentication at step (1), the user is found to be a membership subscriber and transmitting a membership subscription request message to a wearable device if, as a result of the authentication at step (1), the user is found to be not a membership subscriber, and (3) a subscription approval message reception step for receiving a subscription approval message for the membership subscription request message transmitted at step (2) from the wearable device.

The "system and method for controlling the temperature of a user" may be implemented in the form of a program and may then be recorded on a recording medium readable by an electronic device or distributed through a program download management apparatus (or server).

DETAILED DESCRIPTION

Hereinafter, a "system and method for controlling the temperature of a user" are described in detail with reference to the accompanying drawings. Embodiments to be described are provided in order for those skilled in the art to easily understand the technical spirit of the present invention, and the present invention is not restricted by the embodiments. Furthermore, contents represented in the accompanying drawings have been diagrammed in order to easily describe the embodiments of the present invention, and the contents may be different from drawing forms that are actually implemented.

Elements to be described herein are only examples for implementing the embodiments of the present invention. Accordingly, in other implementations of the present invention, different elements may be used without departing from the spirit and scope of the present invention.

Furthermore, each of the elements may be purely implemented using a hardware or software element, but may be implemented using a combination of various hardware and software elements that perform the same function. Furthermore, two or more elements may be implemented together by a piece of hardware or software.

Furthermore, an expression that some elements are "included" is an expression of an "open type", and the expression simply denotes that the corresponding elements are present, but should not be construed as excluding additional elements.

Hereinafter, embodiments of the present invention are described in detail with reference to the accompanying drawings.

Figure 1:
FIG. 1 is a diagram showing the configuration of a system for controlling the temperature of a user according to an embodiment of the present invention.

FIG. 1 is a diagram showing the configuration of a system for controlling the temperature of a user according to an embodiment of the present invention.

Referring to FIG. 1, the system for controlling the temperature of a user includes a wearable device 100 and a service server 200, which are connected over a communication network.

The wearable device 100 includes a first temperature measurement unit for measuring the temperature of a user. If a temperature difference between a temperature of the user measured by the first temperature measurement unit and a previously stored temperature of the user at normal times is more than a reference temperature difference for a predetermined time, the wearable device 100 transmits temperature measurement information to the service server 200 and receives information for controlling the temperature of the user based on the temperature measurement information from the service server 200. The first temperature measurement unit measures the temperature of a user and is thus located at a portion that comes into contact with the skin of the user.

The wearable device 100 calculates a temperature difference by comparing a temperature of the user measured by the first temperature measurement unit with a previously stored temperature of the user at normal times, determines whether the calculated temperature difference is more than a predetermined reference temperature difference, and transmits temperature measurement information to the service server 200 if the state in which the calculated temperature difference is more than the reference temperature difference continues for a predetermined time. In this case, the temperature of the user at normal times may be a temperature determined based on an external temperature (i.e., the temperature of the user at normal times according to the external temperature) or a temperature not related to an external temperature. In particular, if the temperature of the user at normal times is a temperature determined based on an external temperature, the wearable device 100 may include a second temperature measurement unit for measuring an external temperature. The second temperature measurement unit may be mounted on the body of a user so that it is directed toward the outside when the user wears the wearable device because it needs to measure an external temperature. The temperature measurement information may include the temperature of a user, an external temperature, a temperature difference, information about the location of the user, time information and so on.

The wearable device 100 receives service information for controlling the temperature of a user, which is based on information about the location and temperature of the user, from the service server 200. In this case, the service information for controlling the temperature of the user may include information about a commodity, a coupon and/or a point in stores that are located in a short distance from the location of the user and that provide a service for controlling the temperature of the user.

Furthermore, when a question about whether the current temperature of an air-conditioning control device is proper is received from the service server 200, the wearable device 100 receives a response to the question from a user and transfers the response to the service server 200. More specifically, when a question about whether the current temperature of the air-conditioning control device is proper, including the current temperature, the temperature of the user, and an external temperature, is received, the wearable device 100 displays a question about whether the current temperature is proper in a pop-up form. The user checks the displayed question about whether the current temperature is proper and inputs information including information about whether the current temperature is proper and a required temperature. The wearable device 100 transmits the inputted information to the service server 200.

The wearable device 100 refers to a device which may be worn on the human body, and includes various types of devices, such as glasses, a watch, a bracelet, shoes, a ring, a belt, a band, a necklace, a headset, and clothing, depending on a part on which the device is worn.

An application (or applet) capable of service processing for controlling the temperature of the user may be stored in the wearable device 100. A service for controlling the temperature of the user, which is provided by the service server 200, may be output through the application.

The wearable device 100 is described in detail later with reference to FIG. 2.

When temperature measurement information including information about the location of a user and information about the temperature of the user is received from the wearable device 100, the service server 200 generates service information for controlling the temperature of the user based on the location information and the temperature information and provides the service information to the wearable device 100.

In other words, if the information about the location of the user includes information about the presence of an air-conditioning control device, the service server 200 transmits a question about whether the current temperature of the air-conditioning control device is proper to the wearable device 100, and controls the temperature of the air-conditioning control device in response to a response from the wearable device 100. In this case, when information including information about whether the current temperature is proper and a required temperature is received from the wearable device 100, the service server 200 remotely controls the temperature of the air-conditioning control device so that it becomes the required temperature.

Since a temperature that is considered to be proper is different for each user, the service server 200 gives a question about whether the current temperature of the air-conditioning control device is proper. For example, the service server 200 may provide a question about whether the current temperature is high or low although it is now (some) degrees to the user through the wearable device 100, and receives a result value from the wearable device 100.

Furthermore, the service server 200 checks stores located in a short distance from the location of the user, extracts stores that belong to the checked stores and that provide a service for controlling the temperature of the user, generates service information for controlling the temperature of the user, such as information about a commodity, a coupon and/or a point in the extracted stores, and provides the generated service information.

The service server 200 may be implemented using a single operation device or may be implemented in the form of an integration device in which two or more operation devices are connected. For example, the service server 200 may be implemented using a single server or may be implemented in a form in which two or more servers are connected.

The service server 200 is described in detail later with reference to FIG. 5.

The wearable device 100 is equipped with a display unit. The display unit may display a body temperature measured by the first temperature measurement unit, an external temperature measured by the second temperature measurement unit, a temperature difference, and service information for controlling the temperature of the user from the service server. In some embodiments, the wearable device 100 may not include the display unit. In this case, the system for controlling the temperature of a user may further include a user terminal (not shown).

In another embodiment of the present invention, the system for controlling the temperature of a user may further include the user terminal (not shown) for storing the temperature of a user measured by the wearable device 100, an external temperature, and information for controlling the temperature of the user from the service server 200 and for outputting them. In this case, the wearable device 100 and the user terminal may be paired through short-range communication.

Accordingly, in an embodiment of the present invention, not only the wearable device 100 and the service server 200, but the user terminal operates in conjunction with one another. Accordingly, although a user has not worn the wearable device 100, temperature measurement information can be provided to the user and the temperature of the user can be controlled based on service information for controlling the temperature of the user from the service server 200.

The wearable device 100 may periodically measure and predict the temperature of a user and an external temperature by transmitting and receiving data to and from the user terminal. The wearable device 100 may transmit a measured temperature of a user, an external temperature, and service information for controlling the temperature of the user, which has been received from the service server 200, to the user terminal (e.g., a smart phone) paired with the wearable device 100. For example, the wearable device 100 may transmit and receive data using a short-range communication network, such as NFC and Bluetooth. In this case, the wearable device 100 may transmit temperature measurement information from the user terminal to the service server 200 over the short-range communication network. The wearable device 100 may receive service information for controlling the temperature of a user, which has been generated by the service server 200, from the service server 200, and may transmit the received service for controlling the temperature of the user to the user terminal.

The user terminal includes a Personal Digital Assistant (PDA), a smart phone, a cellular phone, a Personal Communication Service (PCS) phone, a Global System for Mobile (GSM) phone, a Wideband CDMA (W-CDMA) phone, a CDMA-2000 phone, a Mobile Broadband System (MSB) phone, etc. which may be applied to various wired/wireless environments. In this case, the user terminal may refer to a portable small-sized device, but may also be called a mobile communication terminal if it includes a camcorder, a laptop computer or the like. In an embodiment of the present invention, the user terminal is not specifically limited thereto.

Figure 2:
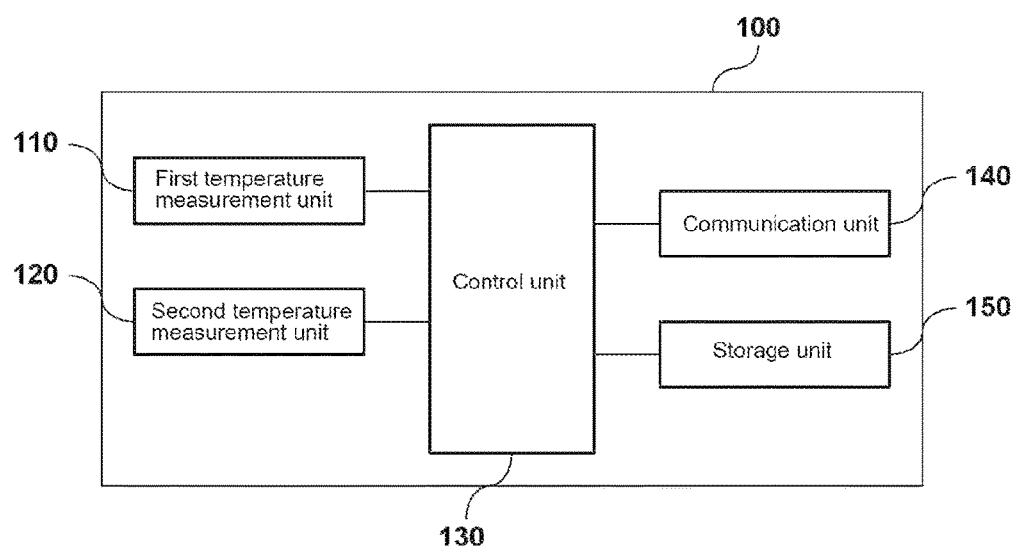
FIG. 2 is a schematic block diagram of a wearable device according to an embodiment of the present invention.
Figure 3:
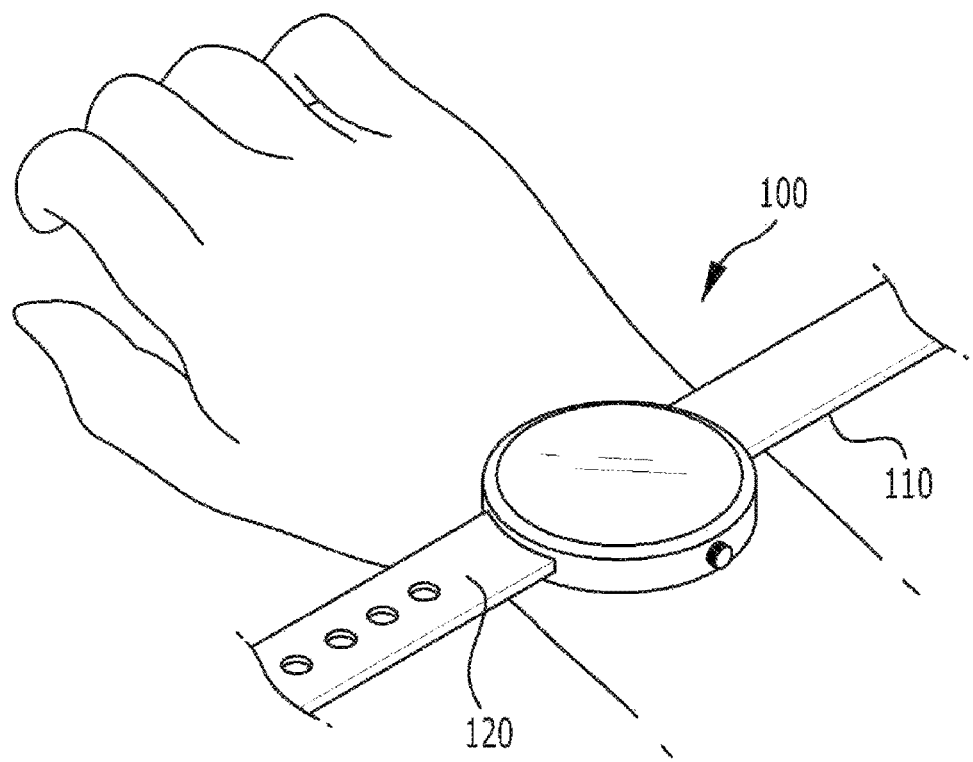
FIG. 3 is a diagram showing an example in which the wearable device according to an embodiment of the present invention has been implemented using a smart watch.
Figure 4:
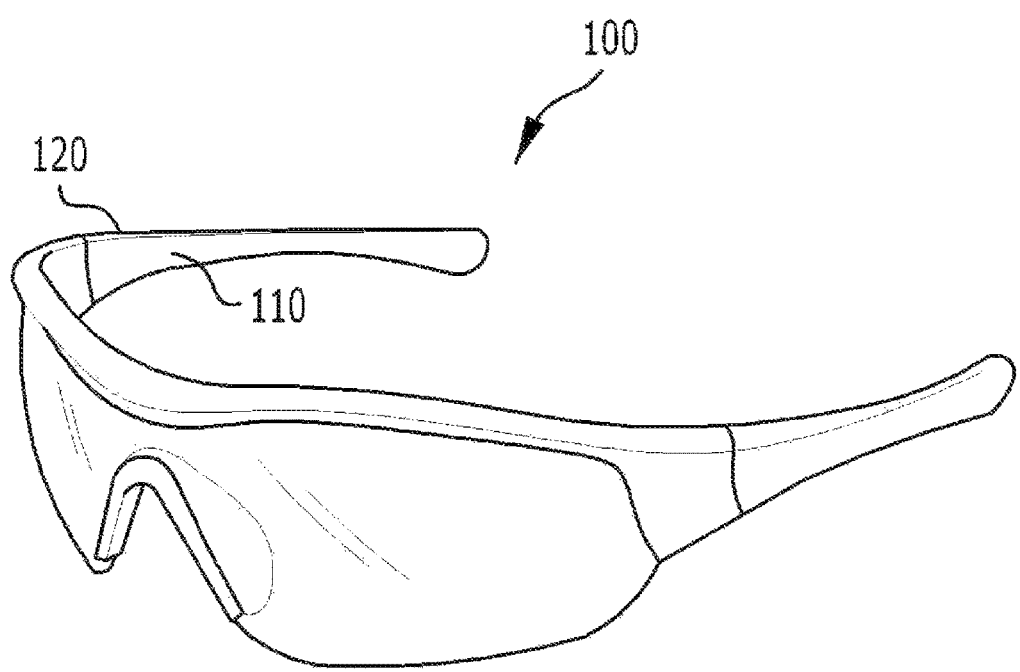
FIG. 4 is a diagram showing an example in which the wearable device according to an embodiment of the present invention has been implemented using smart glasses.

FIG. 2 is a schematic block diagram of a wearable device according to an embodiment of the present invention. FIG. 3 is a diagram showing an example in which the wearable device according to an embodiment of the present invention has been implemented using a smart watch. FIG. 4 is a diagram showing an example in which the wearable device according to an embodiment of the present invention has been implemented using smart glasses.

Referring to FIG. 2, the wearable device 100 includes a first temperature measurement unit 110, a control unit 130, a communication unit 140, and a storage unit 150.

The first temperature measurement unit 110 is configured in the wearable device 100 and measures the temperature of a user who has worn the wearable device 100. The first temperature measurement unit 110 measures the temperature of a user who has worn the wearable device 100, and thus is located in a portion that comes into contact with the skin of the user when the user wears the wearable device 100. The first temperature measurement unit 110 may be implemented using a plurality of temperature sensors, that is, means for measuring the temperature of a user who has worn the wearable device 100.

The first temperature measurement unit 100 senses a measured temperature of a user periodically or continuously and transmits a corresponding electrical signal to the control unit 130. Accordingly, the user can check the results of the measured temperature through the wearable device 100 or another device operating in conjunction with the wearable device 110. In an emergency situation, the wearable device 100 or a user terminal operating in conjunction with the wearable device 100 can directly notify the outside of the emergency situation instead of a corresponding user.

If a temperature difference between a temperature of a user measured by the first temperature measurement unit 110 and a previously stored temperature of the user at normal times is more than a reference temperature difference for a predetermined time, the control unit 130 transmits temperature measurement information to the service server 200 through the communication unit 140 and receives information for controlling the temperature of the user based on the temperature measurement information from the service server 200. In this case, the temperature measurement information may include the temperature of the user, an external temperature, the temperature difference, information about the location of the user, and time information.

That is, the control unit 130 calculates a temperature difference by comparing a temperature of a user measured by the first temperature measurement unit 110 with a previously stored temperature of the user at normal times, and determines whether the calculated temperature difference is more than a predetermined reference temperature difference. If, as a result of the determination, it is determined that the calculated temperature difference is more than the reference temperature difference and such a state continues for a predetermined time, the control unit 130 transmits temperature measurement information to the service server 200. In this case, the temperature of the user at normal times may be a temperature determined based on an external temperature (i.e., the temperature of the user at normal times according to the external temperature) or a temperature at normal times which is not related to an external temperature. In particular, if the temperature of the user at normal times is a temperature determined based on an external temperature, the wearable device 100 may further include a second temperature measurement unit 120 for measuring an external temperature. The second temperature measurement unit 120 is means for measuring an external temperature and may be implemented using a temperature sensor. The second temperature measurement unit 120 measures an external temperature and thus may be mounted on the body of a user so that it is directed toward the outside when the user wears the wearable device 100. In some embodiments, the wearable device 100 may not include the second temperature measurement unit 120, but may receive an external temperature from an external device for providing external temperature information.

Furthermore, the control unit 130 receives service information for controlling the temperature of a user, which is based on information about the location and temperature of the user, from the service server 200. In this case, the service information for controlling the temperature of the user may include information about a commodity, a coupon and/or a point in stores that belong to stores located in a short distance from the location of the user and that provide a service for controlling the temperature of the user.

Furthermore, when a question about whether the current temperature of an air-conditioning control device is proper is received from the service server 200, the control unit 130 may receive a response to the question from a user and transfers the response to the service server. More specifically, when a question about whether the current temperature of the air-conditioning control device is proper, including the current temperature, the temperature of the user, and an external temperature, is received, the control unit 130 displays the question about whether the current temperature is proper. The user checks the displayed question about whether the current temperature is proper, and inputs information including information about whether the current temperature is proper and a required temperature. The control unit 130 transmits the inputted information to the service server.

For example, when a question about whether the current temperature of an air-conditioning control device is proper, including that the current temperature is 28 degrees and the temperature of a user is 36.8 degrees, is received, the user inputs a required temperature of 23 degrees in order to lower an external temperature. In response thereto, the control unit 130 transmits the required temperature, inputted by the user, to the service server. The service server remotely controls the temperature of the air-conditioning control device so that it becomes 23 degrees.

The communication unit 140 functions to transmit and receive data to and from various electronic devices. In particular, the communication unit 140 may be connected to two or more devices and may transmit and receive various types of information, such as temperature measurement information and service information for controlling a temperature.

The storage unit 150 functions to store data related to the operation of the wearable device 100. Known storage media may be used as the storage unit 150. For example, one or more of known storage media, such as ROM, PROM, EPROM, EEPROM, and RAM, may be used as the storage unit 150.

In particular, a temperature of a user measured by the first temperature measurement unit 110, a temperature difference between a measured temperature and a temperature at normal times, an external temperature measured by the second temperature measurement unit 120, and service information for controlling the temperature of a user may be stored in the storage unit 150.

The storage unit 150 may store applications (or applets) that are collected and managed by the control unit 130 and that are capable of performing a service for controlling the temperature of a user. The pieces of stored information may be selected by the control unit 130, if necessary.

The control unit 130 may store an application (or applet) capable of performing a service for controlling the temperature of a user in the storage unit 150. The control unit 130 may drive and control such an application so that a service for controlling the temperature of a user, which is provided by the service server, is output.

The control unit 130 functions to control the operations of various elements of the wearable device 100, including the first temperature measurement unit 110, the second temperature measurement unit 120, the communication unit 140, and the storage unit 150.

The control unit 130 may include at least one operation device. The operation device may be a general-purpose Central Processing Unit (CPU), a programmable device (e.g., a CPLD or FPGA) implemented to be suitable for a specific object, an Application-Specific Integrated Circuit (ASIC) or a microcontroller chip.

The wearable device 100 according to an embodiment of the present invention may further include a display unit (not shown) for displaying various types of information related to the operation of the wearable device 100. In particular, the display unit may display various types of information, such as a temperature of a user measured by the first temperature measurement unit 110, an external temperature measured by the second temperature measurement unit 120, and information for controlling the temperature of the user. The display unit may be implemented using various display devices including an LCD and an LED.

Furthermore, the wearable device 100 according to an embodiment of the present invention may further include a power supply unit (not shown) for supplying power. Furthermore, the wearable device 100 according to an embodiment of the present invention may further include a short-range communication unit (not shown) for short-range wireless communication with a user terminal owned by a user. The short-range communication unit may perform communication in accordance with various standards, such as Wi-Fi, Bluetooth communication, Zigbee communication, infrared rays communication (IrDA), a Radio Frequency (RF), such as a Ultra High Frequency (UHF) or a Very High Frequency (VHF), and ultra-wideband communication (UWB).

The wearable device 100 configured as described above may be implemented in the form of a smart watch, a smart band, smart glasses or the like.

If the wearable device 100 is implemented in the form of a smart watch, the smart watch is worn on the wrist of a user as shown in FIG. 3. Accordingly, the first temperature measurement unit 110 is mounted on a portion that comes into contact with the wrist of the user, and the second temperature measurement unit 120 is mounted on a portion directed toward the outside. Furthermore, the smart watch is equipped with a display unit, and thus may display various types of information, such as a temperature of a user measured by the first temperature measurement unit 110, an external temperature measured by the second temperature measurement unit 120, and information for controlling the temperature of the user, through the display unit. In such a smart watch, the size of the display unit is inevitably limited in the nature of a watch. In this case, the temperature of a user and an external temperature may be measured through the smart watch, whereas displayed information may be output through smart glasses or a user terminal. That is, a plurality of wearable devices may operate in conjunction with each other to provide service information for controlling the temperature of a user.

Furthermore, if the wearable device 100 is implemented in the form of a smart band, the smart band is worn on the wrist of a user like a smart watch. Accordingly, the first temperature measurement unit 110 is mounted on a portion that comes into contact with the wrist of the user, and the second temperature measurement unit 120 is mounted on a portion directed toward the outside. Most of smart bands do not include a display unit. Accordingly, the smart band may display various types of information, such as a temperature of a user measured by the first temperature measurement unit 110, an external temperature measured by the second temperature measurement unit 120, and information for controlling the temperature of the user, while operating in conjunction with another device. In this case, another device may be a wearable device, such as a smart watch or smart glasses, and may be any device including a display unit other than a wearable device.

Furthermore, if the wearable device 100 is implemented in the form of smart glasses as shown in FIG. 4, the first temperature measurement unit 110 is mounted on a portion that comes into contact with the skin of a user, and the second temperature measurement unit 120 is mounted on a portion directed toward the outside. The smart glasses are advantageous in that they can be used as a display unit without a separate display unit. Accordingly, various types of information, such as a temperature of a user measured by the first temperature measurement unit 110, an external temperature measured by the second temperature measurement unit 120, and information for controlling the temperature of the user, may be projected on the glasses themselves.

Figure 5:
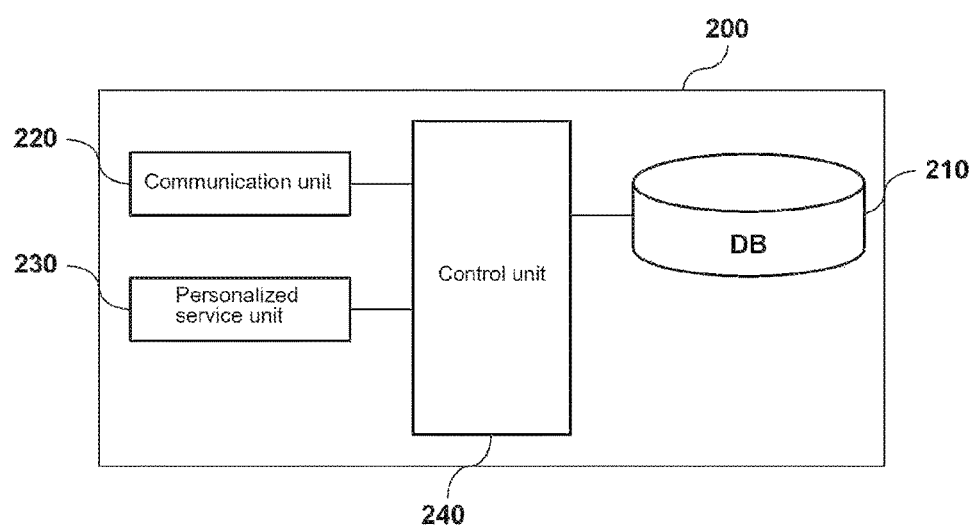
FIG. 5 is a schematic block diagram of a service server according to an embodiment of the present invention.

FIG. 5 is a schematic block diagram of a service server according to an embodiment of the present invention.

Referring to FIG. 5, the service server 200 includes a communication unit 220, a database 210, a personalized service unit 230, and a control unit 240.

The communication unit 220 may receive temperature measurement information from the wearable device and transmit service information for controlling the temperature of a user, which has been generated by the personalized service unit 230, to the wearable device over a communication network. In this case, the communication network includes both wired/wireless communication, and the wearable device and the service server 200 are connected over the communication network.

The communication unit 220 may include various wired communication modules or wireless communication modules and may transmit or receive data in accordance with various wired or wireless communication standards. For example, the communication unit 21 may be implemented in a form including various standard communication modules, such as iTU, iEEE, iSO, and iEC, and may be implemented in a form including various communication modules in addition to the standard communication modules.

The database 210 includes a store database and a user database.

The store database stores store-related information, such as a store name, a store location, information about whether an air-conditioning control device is present, information air-conditioning control device ID, commodity information, coupon information and/or point information.

The user database stores user information, location information, body temperature information, an external temperature, and service information for controlling the temperature of a user.

The database 210 may be implemented to be suitable for an object according to an embodiment of the present invention using a Relation Database Management Database (RDBMS), such as Oracle, Infomix, Sybase, and DB2, or an Object-Oriented Database Management System (OODBMS), such as Gemston, Orion, and O2, and may include proper fields for achieving the functions of the respective databases.

The database 210 has been illustrated as being included in the service server 200, but may be configured separately from the service server 200 depending on the need of those skilled in the art who implement the present invention.

When temperature measurement information including information about the location and temperature of a user is received through the communication unit 220, the personalized service unit 230 generates service information for controlling the temperature of the user, which is based on the location information and the temperature information, and provides the service information to the wearable device or remotely controls the temperature of an air-conditioning control device if the air-conditioning control device is present in the location of the user.

More specifically, when temperature measurement information is received from the wearable device of a user, the personalized service unit 230 checks information about the location of the user, and determines whether an air-conditioning control device is present at a place where the user is located by searching the store database. If, as a result of the determination, it is determined that an air-conditioning control device is present, the personalized service unit 230 obtains the current temperature of the corresponding air-conditioning control device and transmits a question about whether the current temperature is proper, including the current temperature, to the wearable device. In this case, the question about whether the current temperature is proper may include the temperature of the user, an external temperature, and the current temperature of the air-conditioning control device. When information, including information about whether the current temperature is proper or not and a required temperature, is received from the wearable device, the personalized service unit 230 remotely controls the temperature of the corresponding air-conditioning control device so that it becomes the required temperature.

If, as a result of the determination, it is determined that an air-conditioning control device is not present at the place where the user is located, the personalized service unit 230 checks stores located in a short distance from the location of the user by searching the store database and extracts stores that belong to the checked stores and that sell a service (e.g., food) capable of controlling the temperature of the user. Thereafter, the personalized service unit 230 generates service information for controlling the temperature of the user, including information about commodities, coupons and/or points provided by the extracted stores, and transmits the service information to the wearable device through the communication unit 220.

For example, if the temperature of a user is 36.8 degrees and an external temperature is 31 degrees, the personalized service unit 230 may provide the store names and store locations of stores that belong to stores located in a short distance from the location of the user and that sell food (e.g., ice coffee and ice cream) capable of lowering the temperature of the user and information about commodities, coupons and/or points provided by the stores that sell the food.

The personalized service unit 230 may be implemented in a form including a plurality of processors for executing respective programs on a computing device. The personalized service unit 230 may be implemented using physically independent elements as described above or may be implemented in a form in which the elements are functionally divided within a single processor.

The control unit 240 functions to control the operations of various elements of the service server 200, including the communication unit 220, the database 210, and the personalized service unit 230.

The control unit 240 may include at least one operation device. In this case, the operation device may be a general-purpose Central Processing Unit (CPU), a programmable device (e.g., a CPLD or FPGA) implemented to be suitable for a specific object, an Application-Specific Integrated Circuit (ASIC) or a microcontroller chip.

Figure 6:
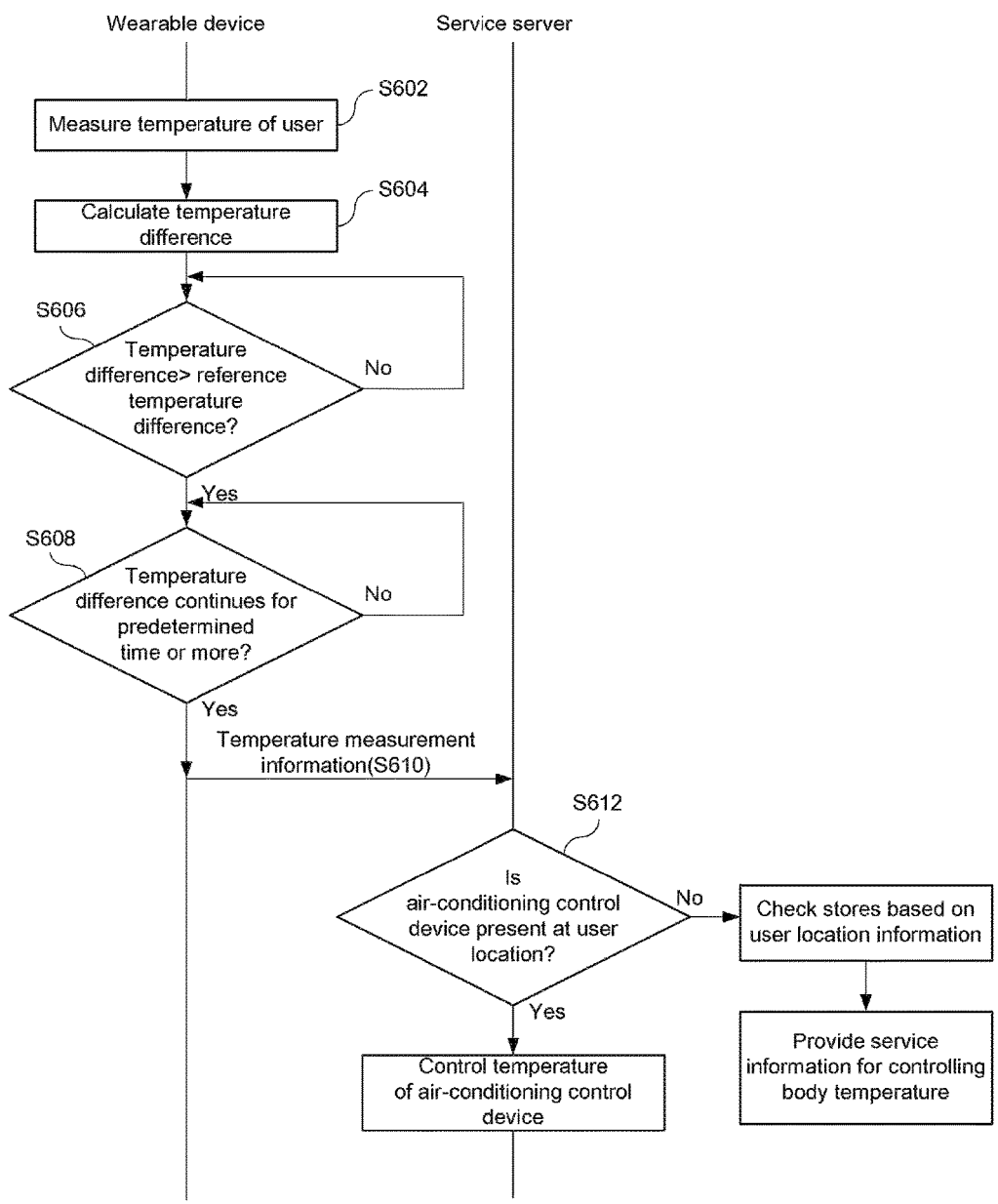
FIG. 6 is a flowchart illustrating a method for controlling the temperature of a user according to an embodiment of the present invention.

FIG. 6 is a flowchart illustrating a method for controlling the temperature of a user according to an embodiment of the present invention.

Referring to FIG. 6, the wearable device measures the temperature of a user through the first temperature measurement unit at step S602.

The wearable device calculates a temperature difference by comparing the body temperature, measured by the first temperature measurement unit, with a previously stored temperature of the user at normal times at step S604, and determines whether the calculated temperature difference is more than a predetermined reference temperature difference at step S606. In this case, the temperature of the user at normal times may be a temperature determined based on an external temperature or may be a temperature not related to an external temperature. In particular, if the temperature of the user at normal times is a temperature determined based on an external temperature, the wearable device may include the second temperature measurement unit for measuring an external temperature.

If, as a result of the determination at step S606, it is determined that the calculated temperature difference is more than the reference temperature difference, the wearable device determines whether the state in which the calculated temperature difference is more than the reference temperature difference continues for a predetermined time at step S608.

If, as a result of the determination at step S608, it is determined that the state in which the calculated temperature difference is more than the reference temperature difference continues for the predetermined time, the wearable device transmits temperature measurement information, including the temperature of the user, an external temperature, the temperature difference, information about the location of the user, and time information, to the service server at step S610.

When the temperature measurement information is received from the wearable device, the service server checks the information about the location of the user and determines whether an air-conditioning control device is present at a place where the user is located at step S612.

If, as a result of the determination at step S612, it is determined that the air-conditioning control device is present, the service server controls the temperature of the corresponding air-conditioning control device at step s614. In this case, the service server obtains the current temperature of the corresponding air-conditioning control device and transmits a question about whether the current temperature is proper, including the obtained current temperature, to the wearable device. When information, including information about whether the current temperature is proper and a required temperature, is received from the wearable device, the service server remotely controls the temperature of the corresponding air-conditioning control device so that it becomes the required temperature.

If, as a result of the determination at step S612, it is determined that the air-conditioning control device is not present, the service server checks stores located in a short distance from the location of the user and extracts stores that belong to the checked stores and that sell a service capable of controlling the temperature of the user at step S618.

Thereafter, the service server generates service information for controlling the temperature of the user, including information about commodities, coupons and/or points provided by the extracted stores, and transmits the generated service information to the wearable device at step S620.

Figure 7:
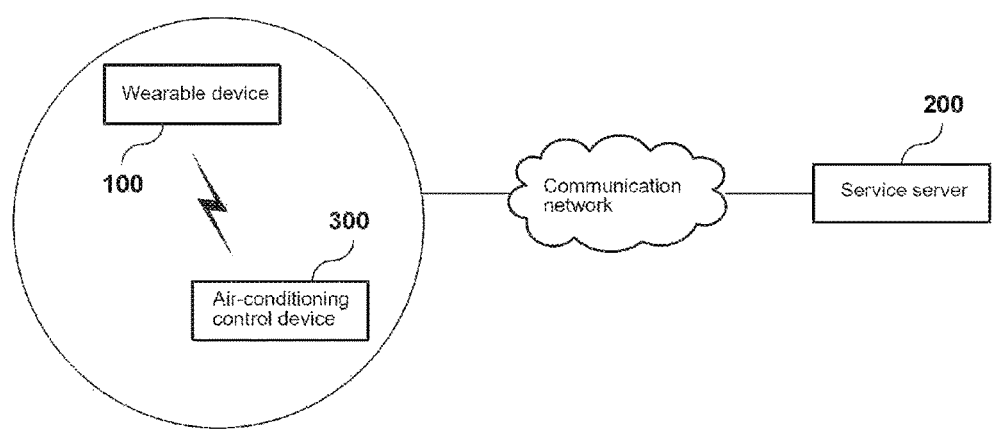
FIG. 7 is a diagram showing the configuration of a system for controlling the temperature of a user according to another embodiment of the present invention.

FIG. 7 is a diagram showing the configuration of a system for controlling the temperature of a user according to another embodiment of the present invention.

Referring to FIG. 7, the system for controlling the temperature of a user includes a wearable device 100, a service server 200, and an air-conditioning control device 300, which are connected over a communication network.

The wearable device 100 includes a first temperature measurement unit for measuring the temperature of a user. If a temperature difference between a temperature of the user measured by the first temperature measurement unit and a previously stored temperature of the user at normal times is more than a reference temperature difference for a predetermined time, the wearable device 100 determines whether an air-conditioning control device is sensed. In this case, the wearable device 100 senses the air-conditioning control device 300 using short-range communication.

When the air-conditioning control device 300 is sensed, the wearable device 100 transmits temperature measurement information, including the body temperature measured by the first temperature measurement unit and the temperature difference, to the sensed air-conditioning control device 300. When a question about whether the current temperature of the air-conditioning control device 300 is proper is received from the air-conditioning control device 300, the wearable device 100 receives a response to the question from the user and transfers the response to the air-conditioning control device 300. More specifically, when a question about whether the current temperature is proper, including the current temperature of the air-conditioning control device 300, the temperature of the user, and an external temperature, is received, the wearable device 100 displays the question about whether the current temperature is proper. The user checks the displayed question about whether the current temperature is proper and inputs information, including information about whether the current temperature is proper and a required temperature. The wearable device 100 transmits the inputted information to the air-conditioning control device 300.

In accordance with another embodiment of the present invention, when the air-conditioning control device 300 is sensed, the wearable device 100 obtains the current temperature of the sensed air-conditioning control device 300 and transmits a control signal that makes the temperature of the air-conditioning control device a predetermined required temperature to the air-conditioning control device 300. The air-conditioning control device 300 controls its temperature in response to the control signal.

If the air-conditioning control device 300 is not sensed through short-range communication, the wearable device 100 transmits temperature measurement information to the service server 200 and receives service information for controlling the temperature of the user, which is based on information about the location and temperature of the user, from the service server 200. In this case, the temperature measurement information may include the temperature of the user, an external temperature, the temperature difference, the information about the location of the user, and time information. The service information for controlling the temperature of the user may include information about commodities, coupons and/or points provided by stores located in a short distance from the location of the user.

The wearable device 100 performing such an operation has the same configuration as that shown in FIG. 2 and only the function of the control unit 130 is different from that shown in FIG. 2. Accordingly, only the function of the control unit 130 is described below.

The control unit 130 calculates a temperature difference by comparing a temperature of a user measured by the first temperature measurement unit 110 with a previously stored temperature of the user at normal times, and determines whether the calculated temperature difference is more than a predetermined reference temperature difference for a predetermined time. In this case, the temperature of the user at normal times may be a temperature determined based on an external temperature or may be a temperature not related to an external temperature. If, as a result of the determination, it is determined that the temperature difference is more than the reference temperature difference for the predetermined time, the control unit 130 determines whether the air-conditioning control device 300 is sensed through short-range communication. If, as a result of the determination, it is determined that the air-conditioning control device 300 is sensed, the control unit 130 controls the temperature of the sensed air-conditioning control device. In this case, the control unit 130 transmits temperature measurement information to the air-conditioning control device 300. When a question about whether the current temperature of the air-conditioning control device 300 is proper is received from the air-conditioning control device 300, the control unit 130 may receive a response, including information about whether the current temperature is proper and a required temperature, from the user and may control the temperature of the air-conditioning control device 300. Furthermore, the control unit 130 may obtain the current temperature of the air-conditioning control device and may transmit a control signal that makes the temperature of the air-conditioning control device 300 a predetermined required temperature to the air-conditioning control device 300, thereby controlling the temperature of air-conditioning control device 300.

Furthermore, if an air-conditioning control device is not sensed through short-range communication, the control unit 130 transmits temperature measurement information to the service server 200 and receives a service for controlling the temperature of a user, which is based on information about the location and temperature of the user, from the service server 200.

Such a wearable device 100 refers to a device which may be worn on the human body, and includes various types of devices, such as glasses, a watch, a bracelet, shoes, a ring, a belt, a band, a necklace, a headset, and clothing, depending on a part on which the device is worn.

An application (or applet) capable of performing service processing for controlling the temperature of a user may be stored in the wearable device 100. A service for controlling the temperature of a user, provided by the service server 200, may be output through the application.

The air-conditioning control device 300 controls its temperature in response to the control signal from the wearable device 100.

More specifically, when the temperature measurement information is received from the wearable device 100, the air-conditioning control device 300 transmits a question about whether the current temperature is proper, including the current temperature, to the wearable device 100. In this case, the question about whether the current temperature is proper may include the temperature of the user, an external temperature, and the current temperature of the air-conditioning control device 300. When information, including information about whether the current temperature is proper and a required temperature, is received from the wearable device 100, the air-conditioning control device 300 controls its temperature so that it becomes the required temperature.

The air-conditioning control device 300 is described in detail later with reference to FIG. 8.

When the temperature measurement information, including information about the location and temperature of the user, is received from the wearable device 100, the service server 200 generates service information for controlling the temperature of the user, which is based on the location information and the temperature information, and transmits the service information to the wearable device 100.

More specifically, the service server 200 checks stores located in a short distance from the location of the user, extracts stores that belong to the checked stores and that provide a service for controlling the temperature of the user, generates service information for controlling the temperature of the user, including at least one of pieces of information about commodities, coupons, and points provided by the extracted stores, and provides the generated service information.

The service server 200 performing such an operation has the same configuration as that shown in FIG. 5 and only the function of the personalized service unit 230 is different from that shown in FIG. 5. Accordingly, only the function of the personalized service unit 230 is described below.

When temperature measurement information is received from the wearable device 100, the personalized service unit 230 checks stores located in a short distance from the location of a user by searching information the store database, and extracts stores that belong to the checked stores and that sell food capable of controlling the temperature of the user. Thereafter, the personalized service unit 230 generates service information for controlling the temperature of the user, including information about commodities, coupons and/or points provided by the extracted stores, and transmits the generated service information to the wearable device 100 through the communication unit 220.

For example, if the temperature of a user is 36.8 degrees and an external temperature is 31 degrees, the personalized service unit 230 may provide the store names and store locations of stores that belong to stores located in a short distance from the location of the user and that sell food (e.g., ice coffee and ice cream) capable of lowering the temperature of the user and information about commodities, coupons and/or points provided by the stores that sell the food.

The service server 200 may be implemented in the form of a single operation device or may be implemented in the form of an integration device in which two or more operation devices are connected. For example, the service server 200 may be implemented in the form of a single server or may be implemented in a form in which two or more servers are connected.

The wearable device 100 is equipped with a display unit, and may display a body temperature measured by the first temperature measurement unit, an external temperature measured by the second temperature measurement unit, a temperature difference, a reference temperature difference, and service information for controlling the temperature of a user, which is received from the service server. In some embodiments, the wearable device 100 may not include a display unit. In this case, the system for controlling the temperature of a user may further include a user terminal (not shown).

In another embodiment of the present invention, the system for controlling the temperature of a user may further include the user terminal (not shown) for storing a temperature of a user measured by the wearable device 100, an external temperature, and information for controlling the temperature of the user which has been received from the service server 200 and for outputting them. In this case, the wearable device 100 and the user terminal may be paired through short-range communication.

Accordingly, in an embodiment of the present invention, not only the wearable device 100 and the service server 200, but the user terminal operates in conjunction with one another. Accordingly, although a user has not worn the wearable device 100, temperature measurement information can be provided to the user and the temperature of the user can be controlled based on service information for controlling the temperature of the user from the service server 200.

The wearable device 100 may periodically measure and predict the temperature of a user and an external temperature by transmitting and receiving data to and from the user terminal.

The wearable device 100 may transmit a measured temperature of a user, an external temperature, and service information for controlling the temperature of the user, which has been received from the service server 200, to the user terminal (e.g., a smart phone) paired with the wearable device 100. For example, the wearable device 100 may transmit and receive data using a short-range communication network, such as NFC and Bluetooth. In this case, the wearable device 100 may transmit temperature measurement information from the user terminal to the service server 200 over the short-range communication network. The wearable device 100 may receive service information for controlling the temperature of a user, which has been generated by the service server 200, from the service server 200, and may transmit the received service for controlling the temperature of the user to the user terminal.

The user terminal includes a Personal Digital Assistant (PDA), a smart phone, a cellular phone, a Personal Communication Service (PCS) phone, a Global System for Mobile (GSM) phone, a Wideband CDMA (W-CDMA) phone, a CDMA-2000 phone, a Mobile Broadband System (MSB) phone, etc. which may be applied to various wired/wireless environments. In this case, the user terminal may refer to a portable small-sized device, but may also be called a mobile communication terminal if it includes a camcorder, a laptop computer or the like. In an embodiment of the present invention, the user terminal is not specifically limited thereto.

Figure 8:
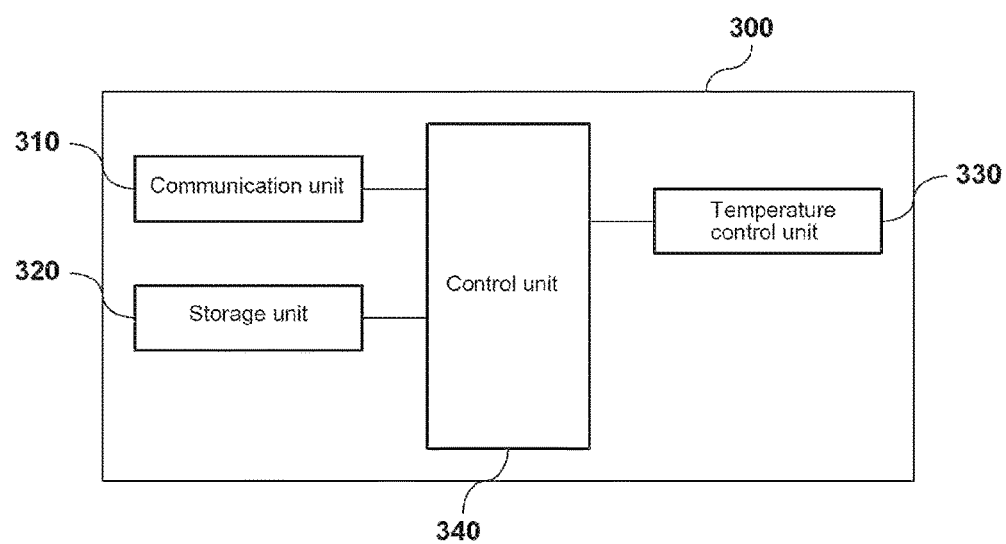
FIG. 8 is a schematic block diagram of an air-conditioning control device according to an embodiment of the present invention.

FIG. 8 is a schematic block diagram of the air-conditioning control device according to an embodiment of the present invention.

Referring to FIG. 8, the air-conditioning control device 300 includes a communication unit 310, a storage unit 320, a temperature control unit 330, and a control unit 340.

The communication unit 310 receives temperature measurement information from the wearable device over a short-range communication network.

The storage unit 320 functions to store data related to the operation of the air-conditioning control device 300. In this case, known storage media may be used as the storage unit 320. For example, one or more of known storage media, such as ROM, PROM, EPROM, EEPROM, and RAM, may be used as the storage unit 320.

The temperature control unit 330 controls its temperature in response to a control signal from the wearable device or the service server.

That is, when temperature measurement information is received from the wearable device, the temperature control unit 330 transmits a question about whether the current temperature of the air-conditioning control device 300 is proper, including the current temperature, to the wearable device. In this case, the question about whether the current temperature is proper may include the temperature of a user, an external temperature, and the current temperature of the air-conditioning control device. When information, including information about whether the current temperature is proper and a required temperature, is received from the wearable device, the temperature control unit 330 controls the temperature of the air-conditioning control device 300 so that it becomes the required temperature.

The temperature control unit 330 may be implemented using processors for executing respective programs on a computing device. The temperature control unit 330 may be implemented using physically independent elements as described above or may be implemented in a form in which the elements are functionally divided within a single processor.

The control unit 340 functions to control the operations of various elements of the air-conditioning control device 300, including the communication unit 310, the storage unit 320, and the temperature control unit 330.

The control unit 340 may include at least one operation device. The operation device may be a general-purpose Central Processing Unit (CPU), a programmable device (e.g., a CPLD or FPGA) implemented to be suitable for a specific object, an Application-Specific Integrated Circuit (ASIC) or a microcontroller chip.

Figure 9:
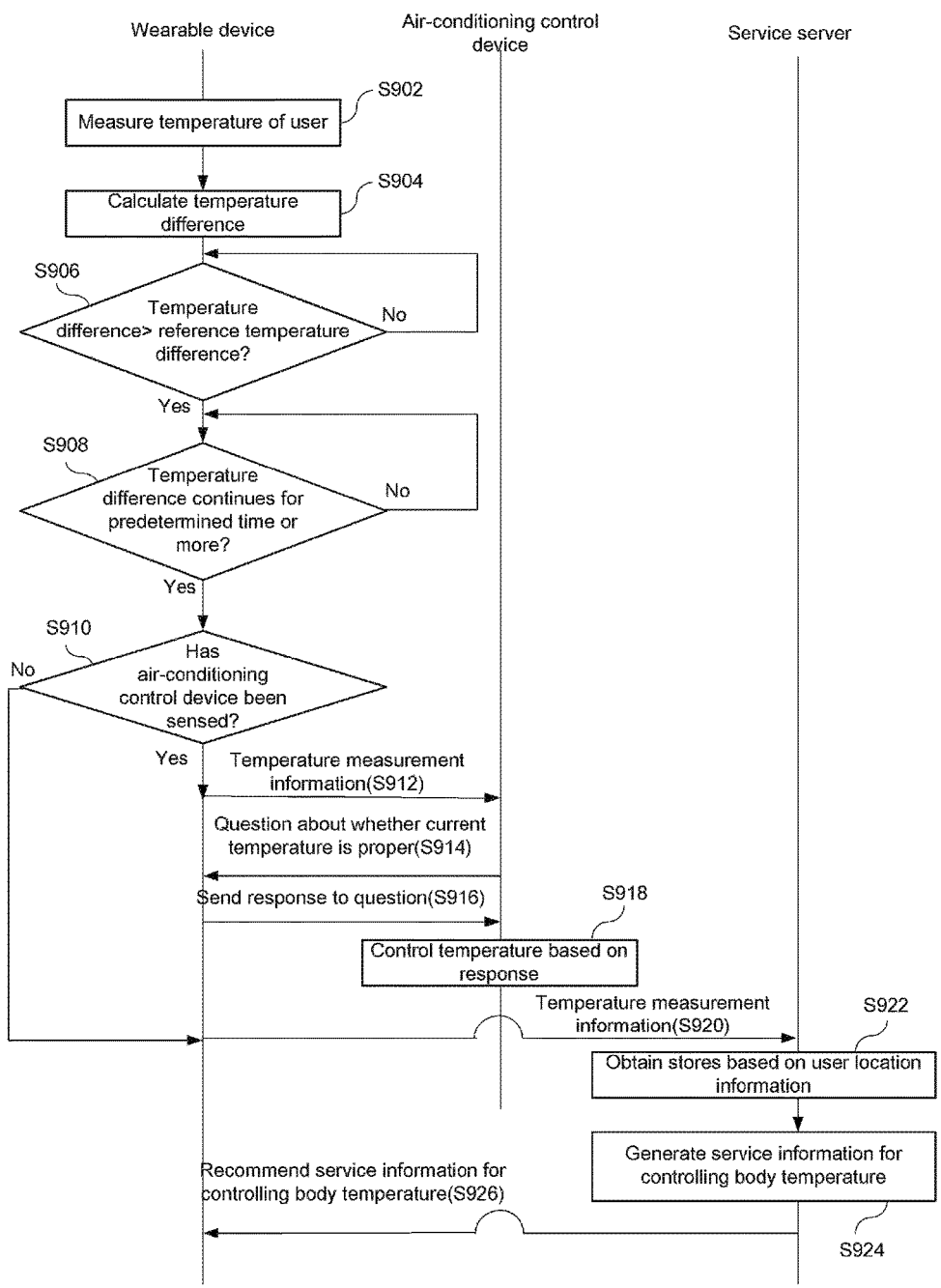
FIG. 9 is a flowchart illustrating a method for controlling the temperature of a user according to another embodiment of the present invention.

FIG. 9 is a flowchart illustrating a method for controlling the temperature of a user according to another embodiment of the present invention.

Referring to FIG. 9, the wearable device measures the temperature of a user through the first temperature measurement unit at step S902.

The wearable device calculates a temperature difference by comparing the body temperature measured by the first temperature measurement unit with a previously stored temperature of the user at normal times at step S904, and determines whether the calculated temperature difference is more than a predetermined reference temperature difference at step S906. In this case, the temperature of the user at normal times may be a temperature determined based on an external temperature or may be a temperature not related to an external temperature.

If, as a result of the determination at step S906, it is determined that the calculated temperature difference is more than the reference temperature difference, the wearable device determines whether the state in which the calculated temperature difference is more than the reference temperature difference continues for a predetermined time at step S908.

If, as a result of the determination at step S908, it is determined that the state in which the calculated temperature difference is more than the reference temperature difference continues for the predetermined time, the wearable device determines whether the air-conditioning control device is sensed through short-range communication at step S910.

If, as a result of the determination at step S910, it is determined that the air-conditioning control device is sensed, the wearable device transmits a control signal for controlling the temperature of the sensed air-conditioning control device to the air-conditioning control device.

The air-conditioning control device controls the temperature of the air-conditioning control device in response to the control signal from the wearable device at step S918. In this case, the air-conditioning control device obtains its own current temperature, transmits a question about whether the current temperature is proper, including the obtained current temperature, to the wearable device at step S914. When information, including information about whether the current temperature is proper and a required temperature, is received from the wearable device at step S916, the air-conditioning control device controls its temperature so that it becomes the required temperature.

If, as a result of the determination at step S910, it is determined that the air-conditioning control device is not sensed, the wearable device transmits temperature measurement information to the service server at step S920.

The service server checks stores located in a short distance from the location of the user and extracts stores that belong to the checked stores and that sell food capable of controlling the temperature of the user at step S922.

Thereafter, the service server generates service information for controlling the temperature of the user, including information about commodities, coupons and/or points provided by the extracted stores at step S924, and transmits the generated service information to the wearable device at step S926.

The method for controlling the temperature of a user may be written in a program form, and pieces of code and code segments that form the program may be easily reasoned by a programmer skilled in the art. Furthermore, a program regarding the method for controlling the temperature of a user may be stored in information storage media readable by an electronic device and may be read and executed by an electronic device.

Figure 10:
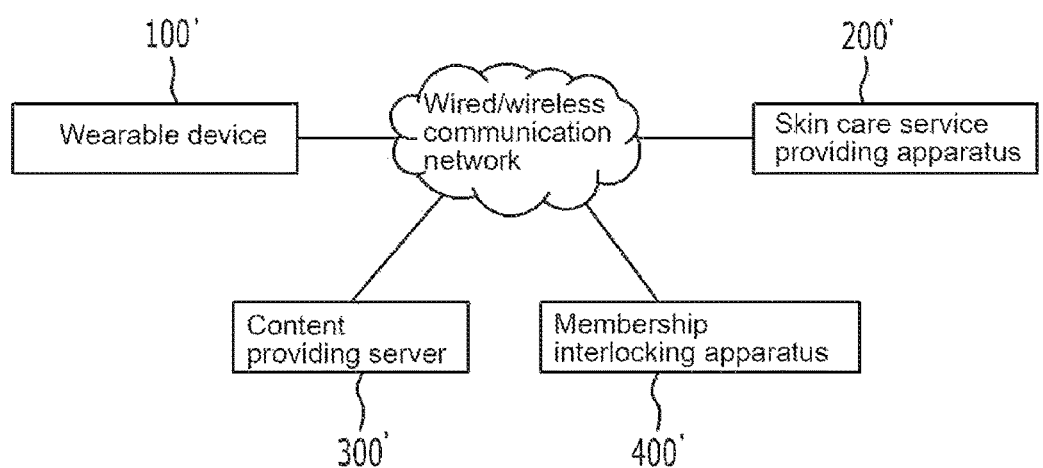
FIG. 10 is a diagram schematically showing the configuration of a system for providing a skin care service using a wearable device according to an embodiment of the present invention.

FIG. 10 is a diagram schematically showing the configuration of a system for providing a skin care service using a wearable device 100' according to an embodiment of the present invention.

Figure 11:
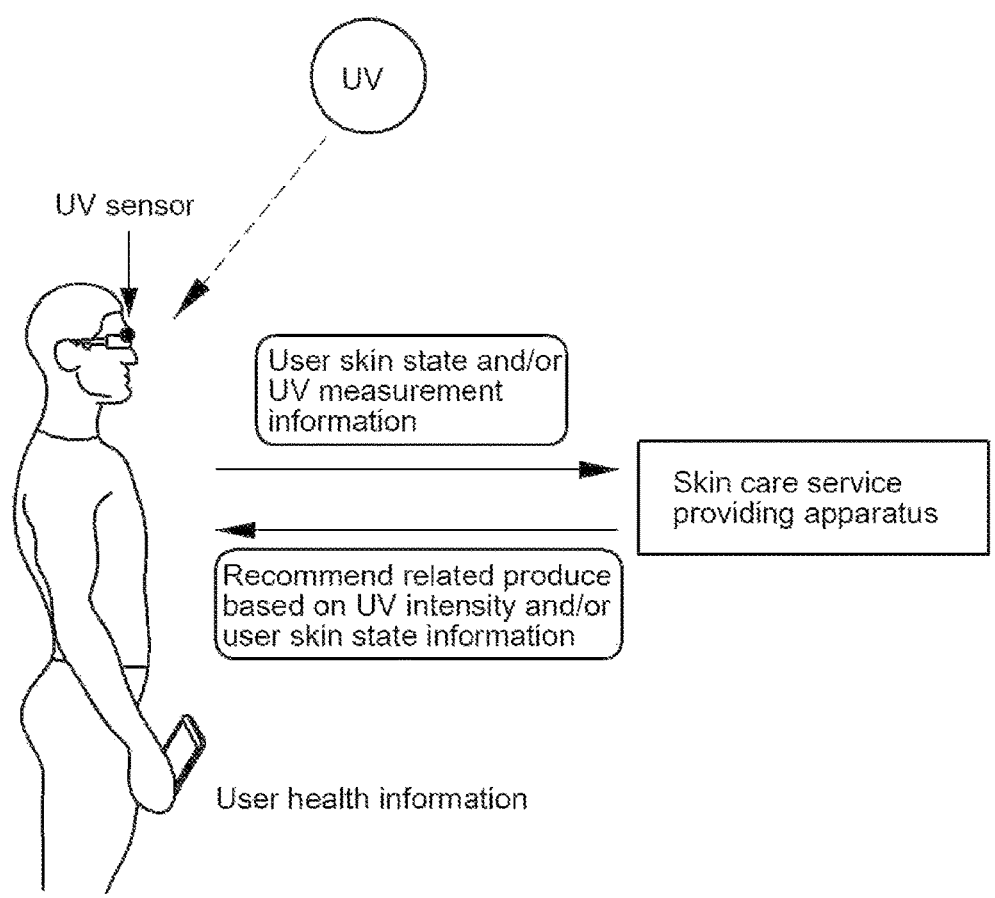
FIG. 11 is a diagram showing the state in which a skin care service using the wearable device is provided according to an embodiment of the present invention.

FIG. 11 is a diagram showing the state in which a skin care service using the wearable device 100' is provided according to an embodiment of the present invention.

In this case, the wearable device 100', a skin care service providing apparatus 200', a content providing server 300', and a membership interlocking apparatus 400' are connected over a wired/wireless communication network. In this case, the communication network includes a base station controller, a base station transmitter and/or a relay station. In this case, the base station controller functions to relay a signal between the base station transmitter and a switching station. The communication network supports both a synchronous method and an asynchronous method. Accordingly, in the case of the synchronous method, a Base Station Transmission System (BTS) may become a transmission/reception base station transmitter and a Base Station Controller (BSC) may become a transmission/reception base station controller. In the case of the asynchronous method, a Radio Transceiver Subsystem (RTS) may become the transmission and reception base station transmitter, and a Radio Network Controller (RNC) may become the transmission and reception base station controller. The communication network according to an embodiment of the present invention is not limited thereto, and may collectively refer to a GSM network other than a CDMA network and networks which may be used in the access network of a next-generation mobile communication system to be developed in the future.

The communication network may further include an access point. The access point is a small base station, such as a femto or pico base station chiefly installed in a building. The femto or pico base station is classified depending on how many the wearable devices 1 or a user terminal can be accessed in terms of the classification of a small base station. Furthermore, the access point includes a short-range communication module for performing short-range communication, such as Wi-Fi, along with a handheld terminal. Short-range communication may be performed in accordance with various standards, such as Bluetooth communication, Zigbee communication, infrared rays communication (IrDA), a Radio Frequency (RF), such as a Ultra High Frequency (UHF) or a Very High Frequency (VHF), and ultra-wideband communication (UWB), in addition to Wi-Fi. The access point may extract the location of a data packet, may designate the best communication route for the extracted location, and may transfer the data packet to a next device, for example, the wearable device 100' along the designated communication route. The access point may share several lines in a common network environment.

The access point is basically divided into a fixed type access point and a mobile type access point. The fixed type access point may include a router, a repeater, a relay station and so on. The mobile type access point may include the bridge product of a specific manufacturer, such as KT's Egg. Such a mobile type access point may read a reception-side address from transmission-side information while guaranteeing free mobility, may designate the most appropriate communication route, and may transmit data.

In an embodiment of the present invention, each of the apparatus and the server includes a transceiver. In this case, the transceiver includes RF transmission means for up-converting a transmitted signal and amplifying the frequency of the signal, RF reception means for performing low-noise amplification on a received signal and down-converting the frequency of the signal, and so on. The transceiver may include at least one of a wireless communication module (not shown) and a wired communication module (not shown). Furthermore, the wireless communication module may include at least one of a wireless network communication module, a Wireless Local Area Network (WLAN) or Wireless Fidelity (Wi-Fi) or Worldwide Interoperability for Microwave Access (WiMAX) communication module, and a Wireless Personal Area Network (WPAN) communication module.

The wireless communication module functions to transmit and receive data according to a wireless communication method. If the apparatus or the server uses wireless communication, it may transmit or receive data to or from using any one of the wireless network communication module, the WLAN communication module, and the WPAN communication module.

Referring to FIG. 10, the system for providing a skin care service using the wearable device 100' according to an embodiment of the present invention includes the wearable device 100', the skin care service providing apparatus 200', and the content providing server 300'.

More specifically, the system for providing a skin care service using the wearable device 100' includes the wearable device 100' configured to confirm whether a user is located indoors or outdoors, measure intensity of ultraviolet rays at the confirmed location of the user, transmit data regarding the measured intensity of ultraviolet rays and information about the skin state of the user to the skin care service providing apparatus 200', receive skin care information from the skin care service providing apparatus 200', and display the received skin care information on a screen, the skin care service providing apparatus 200' configured to receive the data regarding the intensity of ultraviolet rays based on the current location of the user from the wearable device 100' and the information about the skin state of the user, generate the skin care information using the received information, and transmit the generated skin care information to the wearable device 100' or the content providing server 300', and the content providing server 300' configured to transmit digital content for a skin care product or service recorded on the skin care information received from the skin care service providing apparatus 200' to the wearable device 100'.

In the digital content, "digital" refers to an information representation method, and "content" collectively refers to information, knowledge, and a database having various forms, such as a symbol, a character, a sound, video, a picture and/or an image. The digital content corresponds to the contents having a form, such as a character, a sound, a picture or an image distributed through the Internet, and does not refer to only information and simple contents, but refers to content having transaction and services inherent therein as assets that create added values using several information technologies. For example, the digital content may include an application that is transferred to the wearable device 100' or a smart device and executed and that is related to a service provided by a service providing company, an electronic coupon related to a store, and an electronic coupon related to a membership.

In another embodiment of the present invention, the system for providing a skin care service using the wearable device 100' may further include the membership interlocking apparatus 400'. The membership interlocking apparatus 400' may perform authentication on a user based on authentication information received from the content providing server 300', may transmit subscription information about the user to the content providing server 300' if, as a result of the authentication, the user is found to be a membership subscriber, and may transmit a membership subscription request message to the content providing server 300' and the wearable device 100' if, as a result of the authentication, the user is found to be not a membership subscriber.

If the membership interlocking apparatus 400' is used, there is an advantage in that a membership related to an affiliated company that provides digital content and a service company that provides a skin care service platform can be induced to become a member.

The membership interlocking apparatus 400' is an additional element, and may directly provide a user with a digital content providing service added to a skin care service without authentication for the user regarding whether the user has joined membership through the membership interlocking apparatus 400'.

Figure 12:
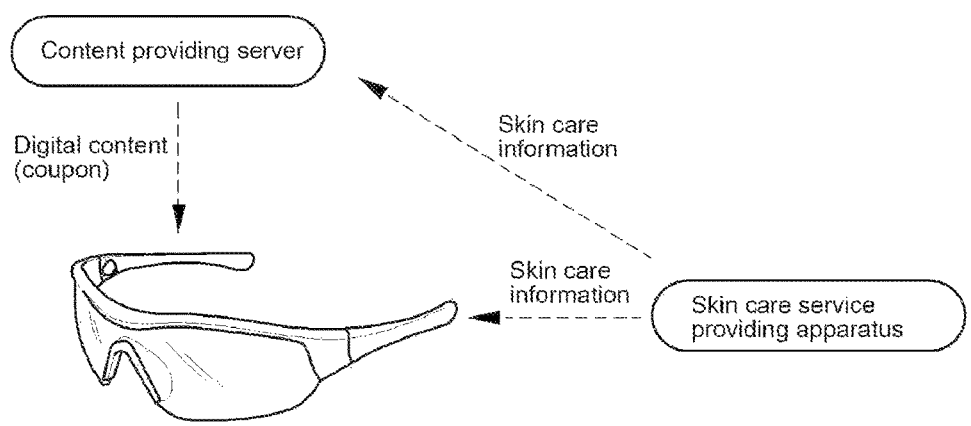
FIG. 12 is a diagram showing the state in which a content providing server and a skin care service providing apparatus provide a skin care service according to an embodiment of the present invention.

FIG. 12 is a diagram showing the state in which the wearable device 100' according to an embodiment of the present invention provides a skin care service.

Referring to FIG. 12, skin care information may be provided through the wearable device 100', for example, a display screen of smart glasses and at the same time, skin care product information and digital content (e.g., a coupon and discount information) may be provided.

Figure 13:
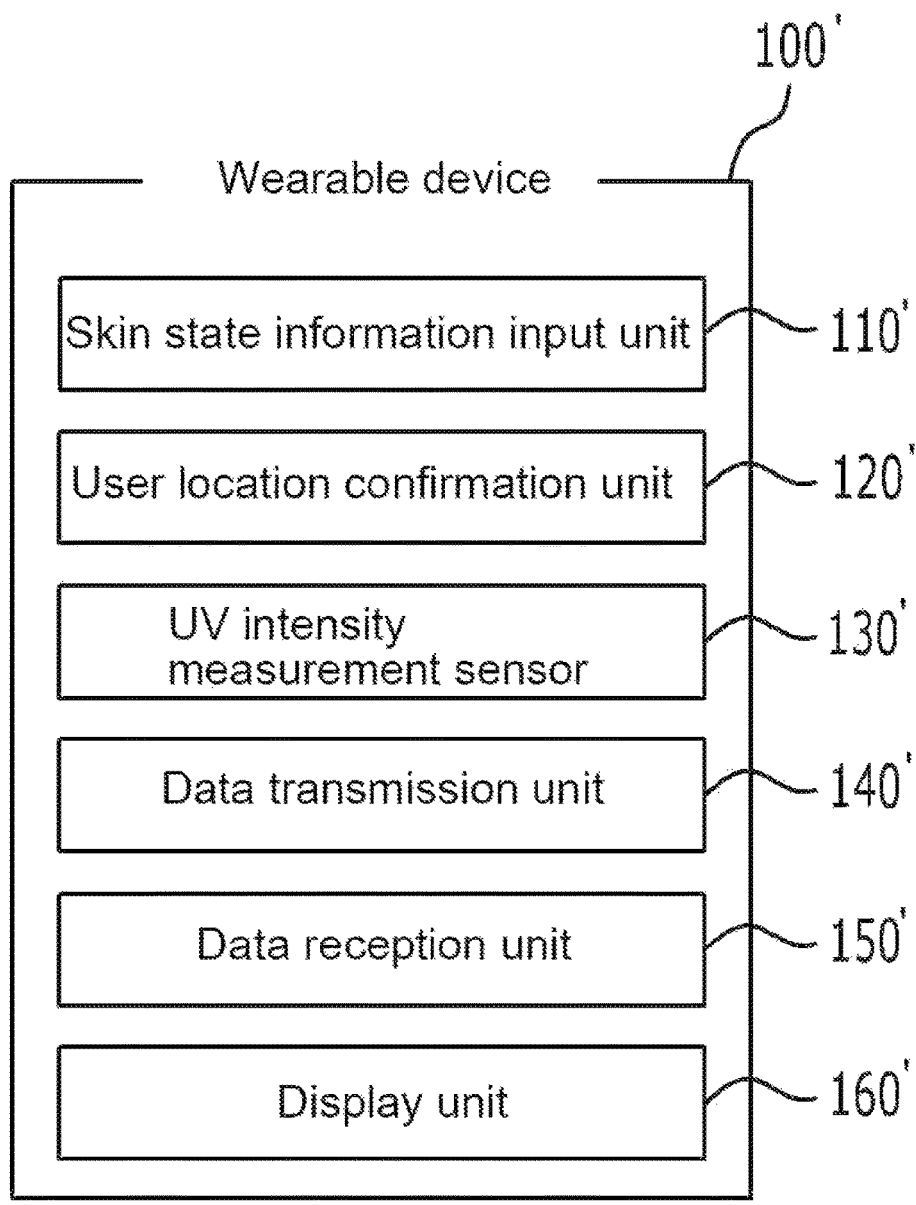
FIG. 13 is a block diagram of the wearable device according to an embodiment of the present invention.

FIG. 13 is a block diagram of the wearable device 100' according to an embodiment of the present invention.

The wearable device 100' according to an embodiment of the present invention includes an ultraviolet (UV) intensity measurement sensor 130', a data transmission unit 140', a data reception unit 150', and a display unit 160'.

More specifically, the wearable device 100' includes the UV intensity measurement sensor 130' configured to measure intensity of ultraviolet rays at the location of a user, the data transmission unit 140' configured to transmit data regarding the intensity of ultraviolet rays measured by the UV intensity measurement sensor 130' and information about the skin state of the user to the skin care service providing apparatus 200', the data reception unit 150' configured to receive skin care information based on the intensity of ultraviolet rays from the skin care service providing apparatus 200', and the display unit 160' configured to display the skin care information received by the data reception unit on a screen.

The wearable device 100' according to an embodiment of the present invention may further include a skin state information input unit 110' configured to receive hospital treatment information about the skin state of the user or information about the current skin state according to self-diagnosis. In this case, the skin state information input unit 110' may receive hospital treatment information about the skin state of the user or information about the current skin state according to self-diagnosis. The skin state information input unit 110' may receive information related to the skin of a user which has been inputted in an application installed on another smart terminal paired with the wearable device 100'.

The wearable device 100' according to an embodiment of the present invention may further include a user location confirmation unit 120' configured to confirm whether a user is located indoors or outdoors. The user location confirmation unit 120' may confirm whether a user is located indoors or outdoors. In this case, the user location confirmation unit 120' may confirm whether a user is located indoors or outdoors using mobile GPS information. Power consumed by the sensor in order to measure intensity of ultraviolet rays can be reduced because intensity of ultraviolet rays is measured only when a user is located outdoors as described above.

When a user enters a store in order to purchase a skin care product or receive a service provided through skin care information, the user location confirmation unit 120' may confirm the location of the user through a communication device disposed in the store other than GPSs. In this case, the communication device may use Wi-Fi or a beacon. Wi-Fi or the beacon is a short-range communication technology for smart terminals in which the location of a user within a radius of 50~70 m is detected and enables message transmission, mobile payment, etc. Wi-Fi or the beacon has a longer available length than Near Field Communication (NFC), and is suitable for O2O services that connect online and offline. If this technology is used, a guidance service, a mobile coupon, etc. at a specific place can be used.

For example, this technology may be used in various ways, such as that when a customer who uses a service enters a store in order to purchase a skin-related commodity, such as sunblock, he or she may automatically check commodity information, customer evaluation, etc. and may also receive a discount coupon.

Furthermore, this technology consumes low power, has low battery consumption of a smart phone, and can confirm a precise location compared to GPSs indoors. Accordingly, this technology may be used to collect personal information because the location of the user of a wearable device or a smart phone can be precisely confirmed.

The UV intensity measurement sensor 130' measures intensity of ultraviolet rays. In this case, the UV intensity measurement sensor may be a single ultraviolet (UV) index measurement chip sensor or an existing UV sensor, but may be a single chip sensor which may be easily attached or mounted on the wearable device. Such an UV intensity measurement sensor may be set to measure ultraviolet rays every time set by a user and may be set to stop its operation when a user is located indoors. Accordingly, there is an advantage in that power consumption of the wearable device can be minimized because whether the UV intensity measurement sensor will operate or not is set depending on time and place as described above. If a single UV index measurement chip sensor is used as the UV intensity measurement sensor 130', it may immediately calculate the UV index of intensity of ultraviolet rays and transmit the data of the measured UV index to the skin care service providing apparatus 200'.

The data transmission unit 140' transmits data regarding intensity of ultraviolet rays that is necessary to generate skin care information and that has been measured by the UV intensity measurement sensor 130' to a skin care service providing apparatus.

When information about a skin state is received from the skin state information input unit 110', the data transmission unit 140' may transfer the information about the skin state of a corresponding user to the skin care service providing apparatus.

The data reception unit 150' receives skin care information based on intensity of ultraviolet rays from the skin care service providing apparatus 200'.

In this case, when the user location confirmation unit 120' confirms that a user has entered a store in order to purchase a skin-related product and a service provided through skin care information, the data reception unit 150' may further receive digital content from the content providing server 300'. Accordingly, there is an advantage in that a customer can be induced to purchase a skin care product because he or she is immediately supplied with digital content while being provided with skin care information although whether the customer has entered a store in order to purchase a commodity is not confirmed.

The display unit 160' displays skin care information, received by the data reception unit 150', on a screen. In this case, the display unit 160' displays information about a series of pieces of operating state and operating results which are generated when the function of the wearable device 100' is performed. Furthermore, the display unit 160' may display a menu of the wearable device 100' or user data inputted by a user.

The display unit 160' may include a Liquid Crystal Display (LCD), a Thin Film Transistor LCD (TFT-LCD), Organic Light Emitting Diodes (OLED), a Light-Emitting Diode (LED), an Active Matrix Organic LED (AMOLED), a flexible display, a 3-dimensional (3D) display, etc. In this case, the display unit 160' may be configured in the form of a touch screen. If the display unit 160' is configured in the form of a touch screen as described above, it may perform some or all of the functions of an input unit. In particular, the display unit 160' according to an embodiment of the present invention displays skin care information received from the skin care service providing apparatus 200' and digital content received from the content providing server 300'.

Furthermore, skin care information and digital content provided to another smart terminal paired with the wearable device 100', for example, smart glasses may be displayed in an application of a smart phone which operates in conjunction with the smart glasses.

When the data reception unit 150' further receives digital content, the received digital content may be displayed on a screen at the same time.

Figure 14:
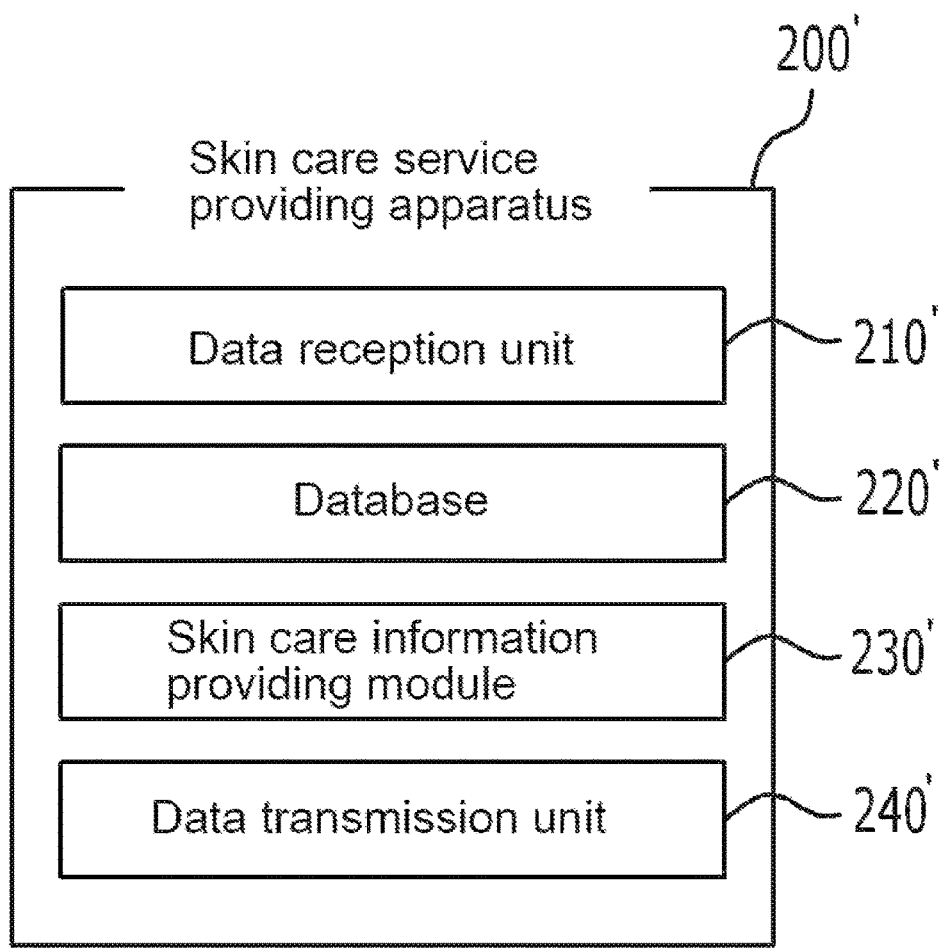
FIG. 14 is a block diagram of the skin care service providing apparatus according to an embodiment of the present invention.

FIG. 14 is a block diagram of the skin care service providing apparatus 200' according to an embodiment of the present invention.

The skin care service providing apparatus 200' according to an embodiment of the present invention includes a data reception unit 210', a database 220', a skin care information providing module 230', and a data transmission unit 240'.

More specifically, the skin care service providing apparatus 200' includes the data reception unit 210' configured to receive data regarding intensity of ultraviolet rays based on the current location of a user from the wearable device, the database 220' configured to store the data regarding the intensity of ultraviolet rays, the skin care information providing module 230' configured to provide skin care information using the data of the intensity of ultraviolet rays stored in the database 220', and the data transmission unit 240' configured to transfer the skin care information provided by the skin care information providing module 230' to the wearable device.

The data reception unit 210' receives data regarding intensity of ultraviolet rays based on the current location of a user from the wearable device. In this case, the data reception unit 210' may further receive information about the skin state of the user.

The database 220' stores the data regarding the intensity of ultraviolet rays. In this case, when the data reception unit 210' further receives information about the skin state of the user, the database 220' may further store the information about the skin state of the user. In this case, the database 220' is a device for storing data, and basically stores data, such as environment variables for search, classification, and analysis. The function of such a database 220' may be implemented using a known technology, and a detailed description of the database is omitted.

The skin care information providing module 230' provides skin care information using the data of the intensity of ultraviolet rays stored in the database 220'. In this case, the skin care information may include at least any one of a UV index value, UV danger index warning information, and information about a skin care product or service. When the data reception unit 210' receives information about the skin state of the user, the skin care information providing module 230' may provide skin care information further using the information about the skin state of the user.

The data transmission unit 240' transfers the skin care information, provided by the skin care information providing module 230', to the wearable device. In this case, the data transmission unit 240' may further transfer the skin care information, provided by the skin care information providing module 230', to the content providing server 300'.

Figure 15:
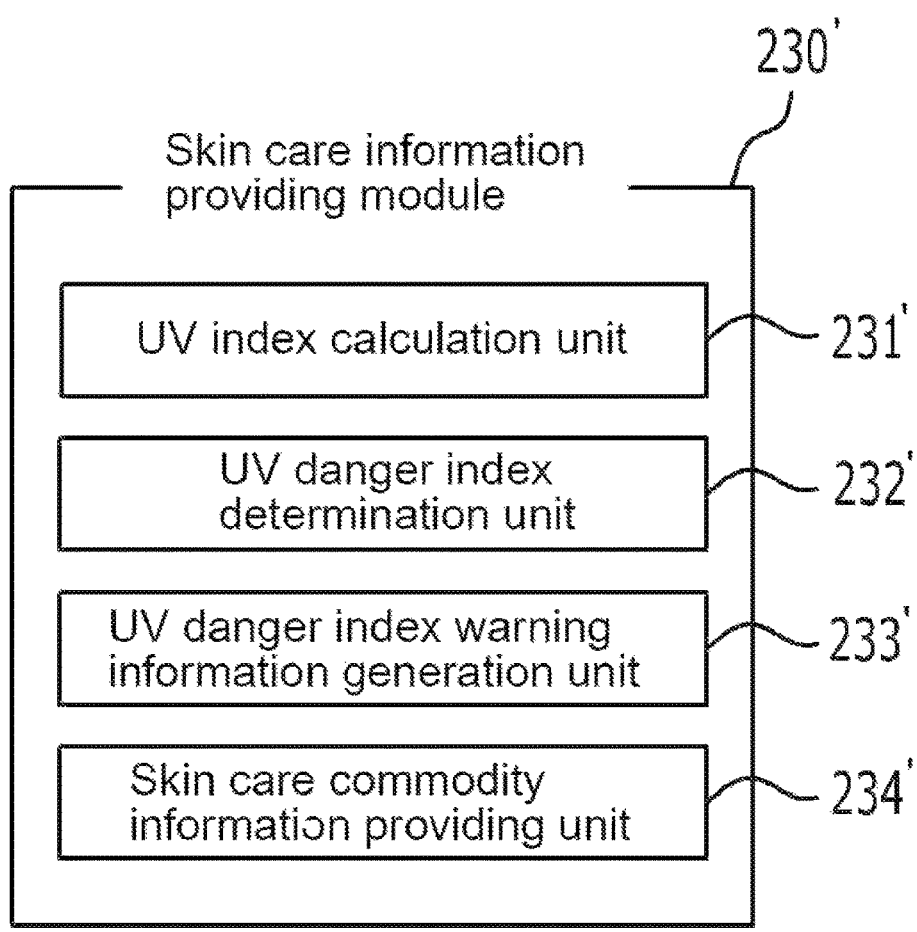
FIG. 15 is a block diagram of a skin care information providing module according to an embodiment of the present invention.

FIG. 15 is a block diagram of the skin care information providing module 230' according to an embodiment of the present invention.

The skin care information providing module 230' of the skin care service providing apparatus according to an embodiment of the present invention includes a UV index calculation unit 231', a UV danger index determination unit 232', and a UV danger index warning information generation unit 233'. More specifically, the skin care information providing module 230' includes a UV index calculation unit 231' configured to calculate a UV index value using the data of intensity of ultraviolet rays stored in the database 220', the UV danger index determination unit 232' configured to determine whether the UV index value calculated by the UV index calculation unit 231' corresponds to a predetermined danger index, and the UV danger index warning information generation unit 233' configured to generate UV danger index warning information if the UV danger index determination unit 232' determines that the UV index value corresponds to the predetermined danger index.

The UV index calculation unit 231' calculates a UV index value using the data of intensity of ultraviolet rays stored in the database 220'. In this case, the UV index is obtained by converting the amount of radiation in an UV-B region in which ultraviolet rays reach the face of the earth at the time of the southing time when a solar altitude is a maximum, and is calculated by applying a cloud correction value based on a weather forecast to the UV value of a clean weather. The UV index may be calculated using numerical data (e.g., atmospheric pressure, the state of the sky, the amount of rainfall, and a precipitation form) and weather observation data (e.g., an ozone value). If the above-described single UV index measurement chip is used as the UV intensity measurement sensor 130', the UV index calculation unit 231' may not calculate a UV index. That is, the single UV index measurement chip installed on the wearable device may directly calculate a UV index and transmit the UV index data to the skin care service providing apparatus 200'.

The UV danger index determination unit 232' determines whether a UV index value calculated by the UV intensity measurement sensor 130' or the UV index calculation unit 231' corresponds to a predetermined danger index. In general, stepwise danger index information (a high step over the UV index 6) provided by World Health Organization (WHO) may be used, but a UV index may be differently set for each user. For example, if a user has set a danger index to more than 4, a calculated UV index of more than 4 may be determined to be the danger index.

The UV danger index warning information generation unit 233' generates UV danger index warning information if the UV danger index determination unit 232' determines a UV index value to be a predetermined danger index.

In this case, the UV danger index warning information may provide a danger exposure step and behavioral know-how information according to the guidelines of WHO. In this case, if a UV index is 2 or less, it is set as a low step. If a UV index is 3~5, it is set as a normal step. If a UV index is 6~7, it is set as a high step. If a UV index is 8~10, it is set as a very high step. If a UV index is more than 11, it is set as a danger step. Corresponding behavioral know-how information is provided for each step.

In the danger step and the very high step, a warning is given that a person may suffer a skin burn within several tens of minutes when he or she is exposed to sunlight. There is provided behavioral know-how information that a person needs to wear an outer garment, a hat, and sunglasses and is induced to sufficiently wear sunblock.

In the high step, a warning is given that a person may suffer a burn within 1~2 hours when he or she is exposed to sunlight. There is provided behavioral know-how information that a person regularly wears sunblock.

In the normal step and the low step, there is no special need for protection measures against the exposure of sunlight, but there is provided behavioral know-how information that a person having a sensitive skin wears sunblock.

The skin care information providing module 230' may further include a skin care commodity information providing unit 234' configured to provide information about a skin care commodity based on a UV index value calculated by the UV index calculation unit 231'.

For example, there may be provided 1. a commodity that satisfies a Sun Protection Factor (SPF) of 0~15 and a PA+ condition when UVI is 0~2, 2. a commodity that satisfies an SPF of 16~25 and a PA++ condition when UVI (UV index) is 3~5, 3. a commodity that satisfies an SPF of 26~35 and a PA++ condition when UVI is 6~7, 4. a commodity that satisfies an SPF of 36~45 and a PA+++ condition when UVI is 8, 9, and 5. a commodity that satisfies an SPF of 45~ and a PA+++ condition when UVI is 10 or more. In this case, the SPF refers to the protection factor of ultraviolet rays UVB, and the PA refers to the protection factor of UVA. For example, SPF 1 may block ultraviolet rays UVB for 10~15 minutes, and SPF30 may block ultraviolet rays UVB for about 4 hours. The PA index includes the three types of PA+, PA++, and PA+++. The more the "+" is, the better the UVA is blocked.

In this case, the skin care commodity information providing unit 234' may provide information about a skin care commodity by further considering information about the skin state of a user.

For example, if a user corresponds to a record of hospital treatment or a sensitive skin according to self-diagnosis information and may suffer skin damage more rapidly compared to a normal pattern when he or she is exposed to ultraviolet rays, commodity information having a higher step than an SPF and PA condition according to suggested UVI may be provided to the user.

Figure 16:
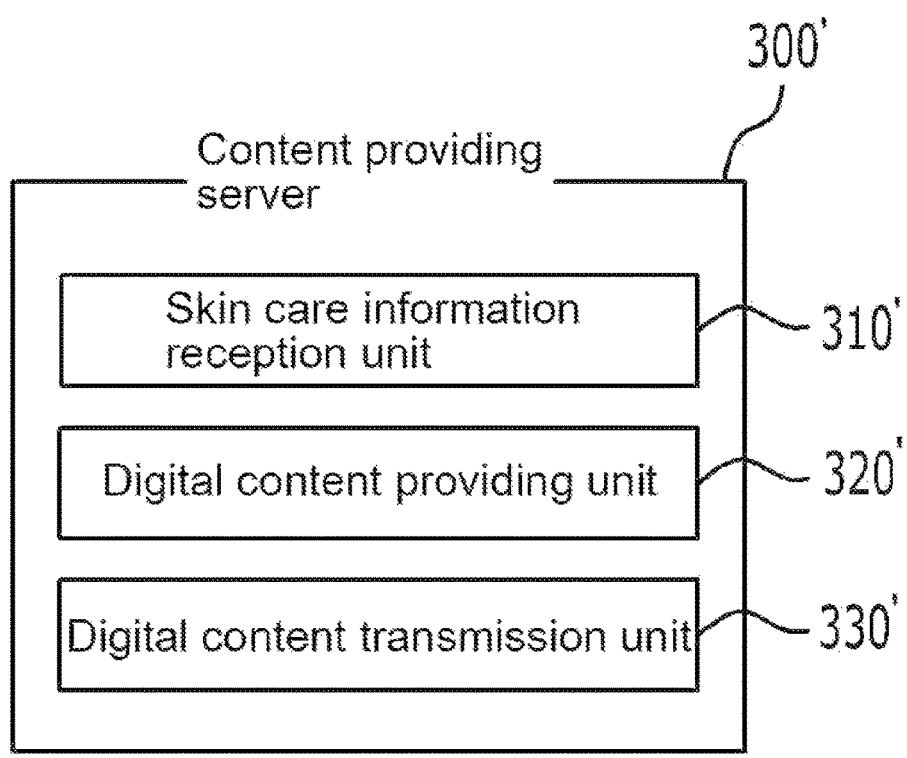
FIG. 16 is a block diagram of a content providing server according to an embodiment of the present invention.

FIG. 16 is a block diagram of the content providing server 300' according to an embodiment of the present invention.

The content providing server 300' according to an embodiment of the present invention includes a skin care information reception unit 310', a digital content providing unit 320', and a digital content transmission unit 330'.

More specifically, the content providing server 300' includes the skin care information reception unit 310' configured to receive skin care information from the skin care service providing apparatus 200', the digital content providing unit 320' configured to transmit the digital content of a skin care product or service, recorded on the skin care information received from the skin care information reception unit 310', to the digital content transmission unit 330', and the digital content transmission unit 330' configured to transfer the digital content received from the digital content providing unit 320' to the wearable device 100'.

The skin care information reception unit 310' receives skin care information for providing a service user with digital content that satisfies a condition from the skin care service providing apparatus 200'. The received skin care information refers to the most recent skin care information transmitted by the service user in real time.

The digital content providing unit 320' transmits the digital content of a skin care product or service, recorded on the skin care information received from the skin care information reception unit 310', to the digital content transmission unit 330'. The digital content providing unit 320' may transmit a list of coupons which may be provided by a digital content server to the digital content transmission unit 330' based on such information.

The digital content transmission unit 330' transfers the digital content received from the digital content providing unit 320' to the wearable device 100'.

The content providing server 300' may further include an authentication information transmission unit configured to transmit authentication information for confirming whether a service user has joined the membership of an affiliated company or skin care service providing company relate to the digital content transmitted from the digital content providing unit 320' to the wearable device 100' to the membership interlocking apparatus 400'.

In this case, various types of information in addition to the telephone number, name and/or content providing history of the service user may be used as the authentication information.

Figure 17:
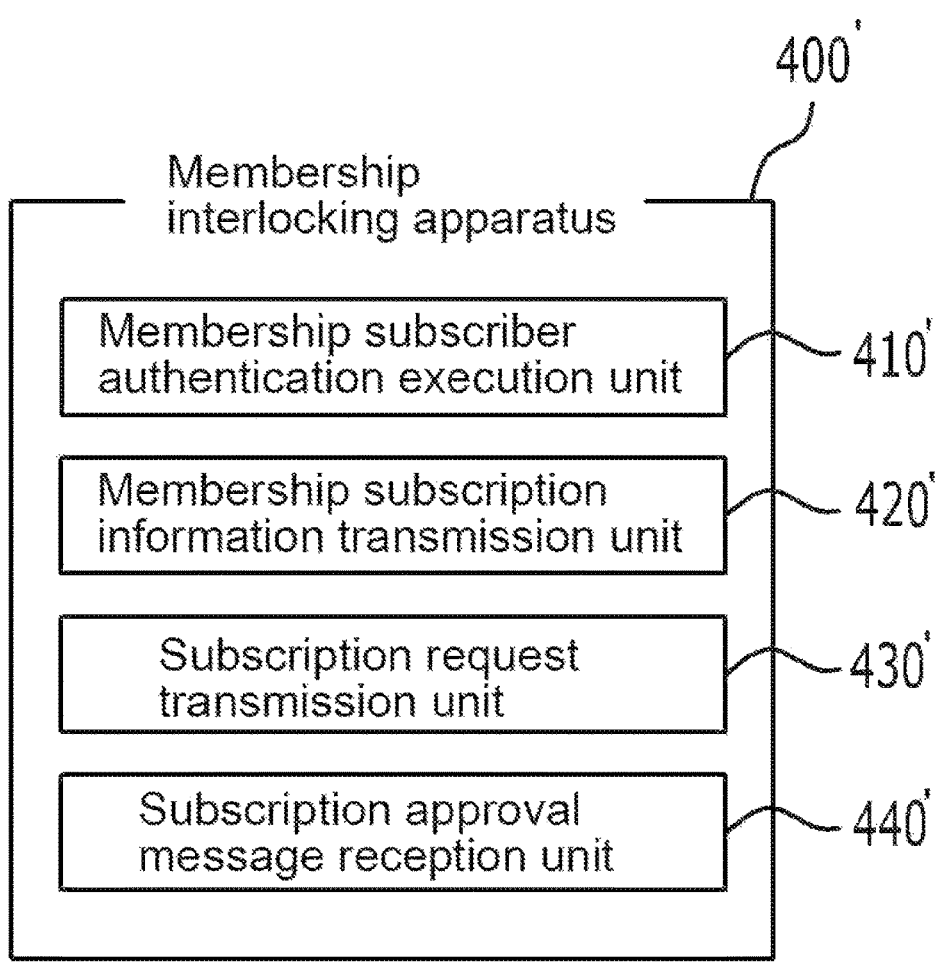
FIG. 17 is a block diagram of a membership interlocking device according to an embodiment of the present invention.

FIG. 17 is a block diagram of the membership interlocking device 400' according to an embodiment of the present invention.

The membership interlocking apparatus 400' according to an embodiment of the present invention includes a membership subscriber authentication execution unit 410', a membership subscription information transmission unit 420', a subscription request transmission unit 430', and a subscription approval message reception unit 440'.

More specifically, the membership interlocking apparatus 400' includes the membership subscriber authentication execution unit 410' configured to perform authentication on a service user based on authentication information received from the content providing server 300', the membership subscription information transmission unit 420' configured to transmit subscription information about the service user to the content providing server 300' if, as a result of the authentication of the membership subscriber authentication execution unit, the service user is found to be a membership subscriber, the subscription request transmission unit 430' configured to transmit a membership subscription request message to the wearable device 100' if, as a result of the authentication of the membership subscriber authentication execution unit, the service user is found to be not a membership subscriber, and the subscription approval message reception unit 440' configured to receive a subscription approval message for a subscription request message transmitted by the wearable device 100'.

If, as a result of the authentication of the membership subscriber authentication execution unit, a service user is found to be a membership subscriber, the membership subscription information transmission unit 420' sends subscription information about the membership subscriber to the content providing server 300'. When the membership subscription information transmission unit 420' sends the subscription information to the content providing server 300', the content providing server 300' may have the right to transmit digital content (e.g., a coupon) to a skin care service user. Accordingly, there is an advantage in that a skin care service user is induced to join a service of an affiliated company that provides corresponding digital content (e.g., a coupon) to the skin care service user.

If, as a result of the authentication of the membership subscriber authentication execution unit, a service user is found to be not a membership subscriber, the subscription request transmission unit 430' sends a membership subscription request message to the wearable device 100'.

The subscription approval message reception unit 440' receives a subscription approval message for a subscription request message transmitted by the wearable device 100'.

In an embodiment of the present invention, the membership interlocking apparatus 400' is an apparatus (or server) for inducing membership subscription, and may be further included depending on the need of a skin care service providing company or a platform providing company.

Figure 18:
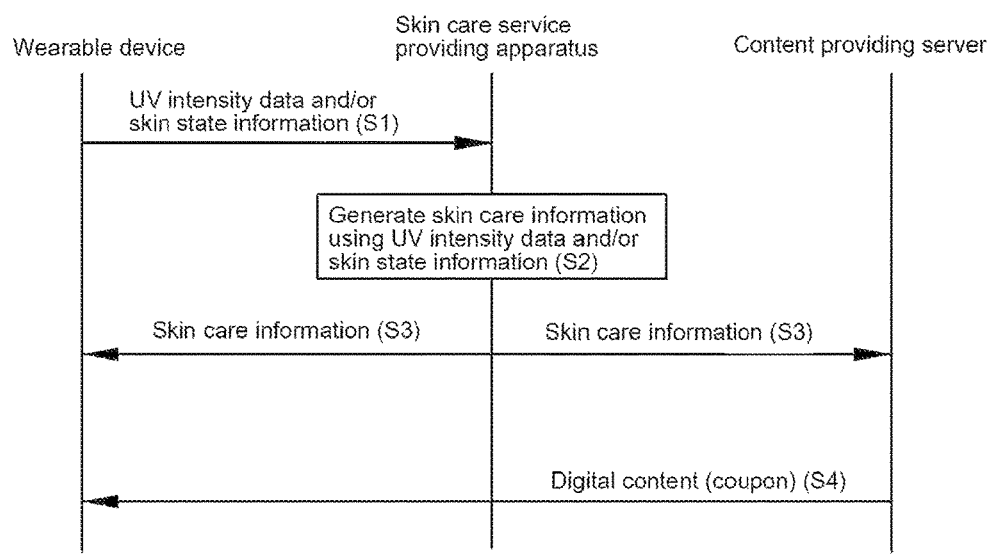
FIG. 18 is a flowchart illustrating a method for providing, by the system for providing a skin care service, a skin care service according to an embodiment of the present invention.

FIG. 18 is a flowchart illustrating a method for providing, by the system for providing a skin care service, a skin care service according to an embodiment of the present invention.

The method for providing, by the system for providing a skin care service, a skin care service according to an embodiment of the present invention includes the steps of (1) sending, by the wearable device, the data of intensity of ultraviolet rays measured by the ultraviolet measurement sensor and hospital treatment information about skin or information about the current skin state according to self-diagnosis, which has been inputted by a user, to the skin care service providing apparatus (S1), (2) generating, by the skin care service providing apparatus, skin care information using the data of the intensity of ultraviolet rays and the hospital treatment information about skin or the information about the current skin state according to self-diagnosis inputted by the user, which have been received at step (1) (S2), (3) transferring, by the skin care service providing apparatus, the skin care information generated at step (2) to the content providing server or the wearable device (S3), and (4) sending, by the content providing server, digital content to the wearable device based on the skin care information transferred at step (3) (S4).

At step (4), the digital content may be provided along with the skin care information or may be provided to a smart terminal or the wearable device 100' in a pop-up form when a user enters a store in order to purchase a skin care product or service recorded on the skin care information.

Figure 19:
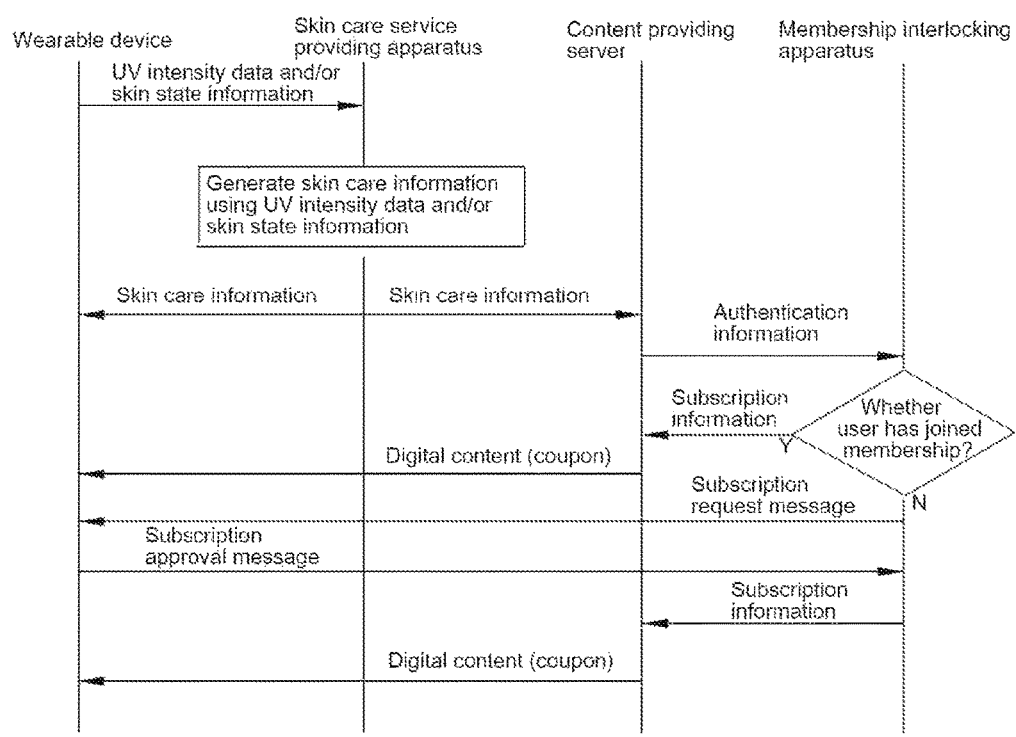
FIG. 19 is a flowchart illustrating a method for providing a skin care service through the execution of authentication through the membership interlocking device according to another embodiment of the present invention.

Referring to FIG. 19, prior to step (4) after step (3), the method for providing, by the system for providing a skin care service, a skin care service may further include the steps of (a) performing, by the membership interlocking apparatus 400', authentication for confirming whether the user has joined the membership of a digital content providing affiliated company using user authentication information received from the content providing server 300', (b) sending, by the membership interlocking apparatus 400', subscription information about the user to the content providing server 300' if, as a result of the authentication at step (a), the user is found to be a membership subscriber and sending a membership subscription request message to the content providing server 300' and the wearable device 100' if, as a result of the authentication at step (a), the user is found to be not a membership subscriber, and (c) transferring the subscription information of the membership subscriber to the content providing server 300' when a subscription approval message for the membership subscription request message transmitted at step (b) is received from the wearable device 100'.

A method for providing, by the content providing server 300', a skin care service according to an embodiment of the present invention includes (1) a skin care information reception step for receiving skin care information from the skin care service providing apparatus 200', (2) a digital content providing step for sending the digital content of a skin care product or service recorded on the skin care information received at step (1) to the digital content transmission unit 330', and (3) a digital content transmission step for transferring the digital content transmitted at step (2) to the wearable device 100'.

The method for providing, by the content providing server 300', a skin care service may further include an authentication information transmission step for sending authentication information for confirming whether a service user has joined the membership of an affiliated company or a skin care service providing company related to the digital content to the membership interlocking apparatus 400' between step (3) and step (2).

A method for providing, by the membership interlocking apparatus 400', a skin care service according to an embodiment of the present invention includes (1) a membership subscriber authentication execution step for performing authentication on a service user based on authentication information received from the content providing server 300', (2) a step for sending membership subscription information about the service user to the content providing server 300' if, as a result of the authentication at step (1), the service user is found to be a membership subscriber and sending a membership subscription request message to the wearable device 100' if, as a result of the authentication at step (1), the service user is found to be not a membership subscriber, and (3) a subscription approval message reception step for receiving a subscription approval message for the membership subscription request message transmitted at step (2) from the wearable device 100'.

As described above, according to an embodiment of the present invention, a skin care service can be provided using the data of intensity of ultraviolet rays measured by the wearable device of a user at the current location of the user, and a service associated with digital content can be provided in real time using skin care information. Furthermore, a service for giving a warning to a user in real time when a UV danger index is reached using skin care information can be provided.

Such a method for providing a service using the system for providing a skin care service may be written in a program form, and pieces of code and code segments that form the program may be easily reasoned by a programmer skilled in the art. Furthermore, a program regarding the method for providing a service using the system for providing a skin care service may be stored in information storage media readable by an electronic device and may be read and executed by an electronic device.

The service server and the skin care service providing apparatus for providing a service for controlling the temperature of a user have the same function.

As described above, those skilled in the art to which the present invention pertains will appreciate that the present invention may be implemented in other detailed forms without changing the technical spirit or essential characteristic of the present invention. Accordingly, it is to be understood that the aforementioned embodiments are only illustrative and do not have a limited range. It is also to be noted that the illustrated flowchart is merely sequential order illustrated to achieve the most preferred results in implementing the present invention, and other additional steps may be provided or some of the steps may be deleted.

Technological characteristics described in this specification and an implementation for executing the technological characteristics may be implemented using a digital electronic circuit, may be implemented using computer software, firmware or hardware including the structure described in this specification and structural equivalents thereof, or may be implemented using a combination of one or more of them. Furthermore, the implementation for executing the technological characteristics described in this specification may be implemented in the form of a computer program product, that is, a module regarding computer program instructions encoded on a kind of program storage media in order to control the operation of a processing system or for execution by the processing system.

A computer-readable medium may be a machine-readable storage device, a machine-readable storage substrate, a memory device, a composition of materials that affect a machine-readable electromagnetic signal or a combination of one or more of them.

In this specification, the term "apparatus (or device)" or "system" covers all apparatuses, devices, and machines for processing data, for example, including a processor, a computer or a multi-processor, or a computer. The processing system may include, for example, code that forms processor firmware, a protocol stack, a database management system, an operating system, or all types of code that form an execution environment for a computer program when a combination of one or more of them is requested, in addition to hardware.

A computer program also known as a program, software, a software application, a script or code may be written in any form of a programming language which includes a compiled or interpreted language or a transcendental and/or procedural language, and may also be implemented in any form including an independent program or module, a component, a subroutine or other units suitable for being used in a computer environment.

The computer program does not need to necessarily correspond to a file of a file system. The program may be stored in a single file provided to a requested program, multiple files that interact with each other (e.g., a file that stores one or more modules, a lower program or part of code), or another program or part of a file including data (e.g., one or more scripts stored in markup language document).

The computer program may be located in a single site or distributed to a plurality of sites and may be implemented to be executed on multiple computers or one or more computers interconnected over wired/wireless communication networks.

A computer-readable medium suitable for storing computer program instructions and data may include all types of non-volatile memory, media, and memory devices including semiconductor memory devices, such as EPROM, EEPROM, and a flash memory device, for example, magnetic disks, such as an internal hard disk or an external disk, magneto optical disks, CDs, and DVDs. The processor and the memory may be supplemented by a logic circuit for a special object or may be integrated into the logic circuit for a special object.

An implementation for executing the subject matter described in this specification may be implemented in an operation system including a backend component, such as a data server, a middleware component, such as an application server, a frontend component, such as a client computer having a web browser or graphic user interface capable of interacting with the implementation of the subject matter described by a user in this specification or all combinations of one or more of the backend, middleware, and frontend components. The component of the system may be accessed by any type or medium for digital data communication, such as a communication network.

Hereinafter, more detailed embodiments capable of implementing elements included in the system and method for controlling the temperature of a user described in this specification along with the above-described contents are described in detail.

The system and method for controlling the temperature of a user, which have been described in this specification, may be used partially or generally through a server related to a client device or web-based storage system or means for executing computer software, program code or instructions on one or more processors included in a server. In this case, the processor may be part of a server, a client, network infrastructure, or a computing platform, such as a mobile computing platform or fixed computing platform. More specifically, the processor may be a kind of computer or processing device capable of executing program instructions, code, etc. Furthermore, the processor may further include memory for storing the method, instructions, code or program for controlling the temperature of a user. If memory is not included in the processor, the processor may access a storage device, such as CD-ROM, DVD, memory, a hard disk, a flash drive, RAM, ROM, or a cache in which the method, instructions, code or program for controlling the temperature of a user.

Furthermore, the system and method for controlling the temperature of a user, which have been described in this specification, may be used partially or generally through an apparatus for executing computer software on a server, a client, a gateway, a hub, a router or network hardware. In this case, the software may be executed in various types of servers, such as a file server, a print server, a domain server, an Internet server, an intranet server, a host server, and a distributed server. The aforementioned servers may further include memory, a processor, a computer-readable storage medium, a storage medium, a communication device, a port, a client, and an interface capable of accessing other servers over wired/wireless networks.

Furthermore, the method, instructions or code for controlling the temperature of a user may also be executed by a server. Other devices required to execute the method for controlling the temperature of a user may be implemented as part of a hierarchical structure associated with the server.

Furthermore, the server may provide an interface to other devices including a client, another server, a printer, a database server, a print server, a file server, communication a server, and a distributed server without limitation. A connection through the interface may enable a program to be easily executed at a remote place over wired/wireless networks.

Furthermore, any one of devices connected to the server through the interface may further include at least one storage device capable of storing the method, instructions or code for controlling the temperature of a user. The central processor of the server may provide instructions, code, etc. to be executed on another device to the device so that the instructions, code, etc. are stored in a storage device.

The system and method for controlling the temperature of a user, which have been described in this specification, may be used partially or generally through network infrastructure. In this case, the network infrastructure may include all of devices, such as a computing device, a server, a router, a hub, a firewall, a client, a personal computer, a communication device, and a routing device, and separate modules capable of executing respective functions. The network infrastructure may further include storage media, such as story flash memory, a buffer, a stack, RAM, and ROM, in addition to the aforementioned devices and module. Furthermore, the method, instructions or code for controlling the temperature of a user may also be executed by and stored in any one of the device, module, and storage medium included in the network infrastructure. Another device required to execute the method for controlling the temperature of a user may also be implemented as part of the network infrastructure.

Furthermore, the system and method for controlling the temperature of a user, which have been described in this specification, may be implemented using hardware or hardware suitable for a specific application and software. In this case, the hardware includes all of general-purpose computer devices, such as a personal computer and a mobile communication terminal, and a business type specific computer device. The computer device may be implemented using a device, such as memory, a microprocessor, a microcontroller, a digital signal processor, an application-specific integrated circuit, a programmable gate array, programmable array logic or a combination of them.

The aforementioned computer software, instructions, code, etc. may be stored or accessed by a readable device. In this case, the readable device may include memory, such as a computer component including digital data used for computing for a specific time, semiconductor storage, such as RAM or ROM, permanent storage, such as an optical disk, high-capacity storage, such as a hard disk, a tape and a drum, optical storage, such as a CD or DVD, and network access type storage, such as flash memory, a floppy disk, a magnetic tape, a paper tape, an independent type RAM disk, high-capacity storage detachable from a computer, dynamic memory, static memory, variable storage, and cloud. In this case, the instructions, code, etc. include all of languages, such as data-oriented languages, such as SQL and dBase, system languages, such as C, Objective C, C++, and Assembly, architecture languages, such as Java and NET, and application languages, such as PHP, Ruby, Perl, and Python, but are not limited thereto. The instructions, code, etc. may include all of languages widely known to those skilled in the art to which the present invention pertains.

Furthermore, the "computer-readable medium" described in this specification includes all of media which contribute to the provision of instruction to a processor in order to execute a program. More specifically, the "computer-readable medium" includes non-volatile media, such as a data storage device, an optical disk and a magnetic disk, volatile media, such as dynamic memory, and transmission media, such as a coaxial cable, a copper wire and an optical fiber for sending data, but is not limited thereto.

The elements for executing the technical characteristics of the present invention included in the block diagrams and flowcharts shown in the accompanying drawings of this specification mean the logical boundary between the elements.

In accordance with a software or hardware embodiment, however, the functions of the illustrated elements and functions thereof may be implemented so that the elements and functions thereof are executed in the form of an independent software module, a monolithic software structure, code, a service or a combination of them and are stored in a medium which is executable by a computer including a processor capable of executing stored program code and instructions. Accordingly, all of such embodiments should be construed as belonging to the scope of the present invention.

Accordingly, the accompanying drawings and technologies thereof describe the technical characteristics of the present invention, but should not be simply reasoned unless a specific array of software for implementing such technical characteristics is clearly described otherwise. That is, the aforementioned various embodiments may be present and may be partially modified while having the same technical characteristics as those of the present invention. Accordingly, such modified embodiments should be construed as belonging to the scope of the present invention.

Furthermore, the flowchart describes operations in the drawing in a specific sequence, but has been illustrated to obtain the most preferred results. It should not be understood that such operations must be executed or all the illustrated operations must be executed in the illustrated specific sequence or sequential order. In a specific case, multi-tasking and parallel processing may be advantageous. Furthermore, the separation of various system components in the aforementioned embodiments should not be construed as requesting such separation in all the embodiments. It should be understood that the aforementioned program components and systems may be integrated into a single software product or packaged into a multi-software product.

In accordance with an embodiment of the present invention, since the wearable device capable of measuring an external temperature and the temperature of a user at the same time is provided, a change in the temperature of the user and a change in the temperature of the user attributable to an external temperature can be sensed, and service information for automatically controlling the temperature of an air-conditioning control device or controlling the temperature of the user can be provided depending on the location of the user.

Furthermore, the temperature of an air-conditioning control device at a place where a user is located can be automatically controlled by sensing a change in the temperature of the user and determining whether such a change corresponds to a comfortable temperature of the user in real time.

Furthermore, a measured temperature of a user is compared with a temperature pattern of the user at normal times. If, as a result of the measurement, a change in the temperature of the user is great, a coupon service and/or information about a store near the user, which may be useful for the user in a corresponding situation, can be provided to the user, thereby being capable of inducting the user to purchase a commodity.

In accordance with an embodiment of the present invention, related information is collected by confirming the location of a user using the wearable device and measuring ultraviolet rays using a sensor attached to the wearable device. Accordingly, UV index information and skin care information can be conveniently provided to the user in real time.

Furthermore, a benefit, such as digital content (e.g., a coupon), can be provided to a service user because a service associated with the digital content is provided to the service user using skin care information in real time.

Furthermore, there is an advantage in that a user can take immediate measures for blocking ultraviolet rays because a warning is given to the user in real time using skin care information when a UV danger index is reached.

Advantages of the present invention are not limited to the aforementioned advantages and may include various other advantages within a range evident to those skilled in the art from the above description.

As described above, this specification is not intended to limit the embodiments of the present invention by the proposed detailed terms. Accordingly, although the present invention has been described in detail in connection with the aforementioned embodiments, a person having ordinary skill in the art to which the present invention pertains may alter, change, and modify the embodiments without departing from the scope of the present invention.

The scope of the present invention is defined by the appended claims rather than the detailed description, and the present invention should be construed as covering all modifications or variations derived from the meaning and scope of the appended claims and their equivalents.

What is claimed is:

1. A wearable device for a service for controlling a temperature for a user, comprising:
    a first temperature measurement unit configured to measure a temperature of the user; and
    a control unit configured to:
        calculate a temperature difference by comparing the measured temperature with a previously stored temperature of the user at normal times;
        provide temperature measurement information to an external device when the calculated temperature difference is greater than a reference temperature difference for a predetermined amount of time; and
        receive, from the external device, service information for controlling the temperature for the user based on the temperature measurement information, wherein the service information comprises at least one of information regarding food provided by stores, or information regarding a coupon or a rewards point provided by the stores, and wherein the stores provide a service for controlling the temperature for the user and are located in a short distance from the location of the user.

2. The wearable device of claim 1, wherein the wearable device further comprises:
    a second temperature measurement unit configured to measure an external temperature; and
    a display unit configured to display at least one of the measured temperature, the measured external temperature, the temperature difference, the reference temperature difference, or the service information for controlling the temperature for the user.

3. The wearable device of claim 1, wherein: the temperature of the user at the normal times is the measured external temperature at the normal times.

4. The wearable device of claim 1, wherein, when an air-conditioning control device is sensed through a short-range communication, the control unit is configured to:
    transmit the temperature measurement information to the sensed air-conditioning control device;
    receive, from the air-conditioning control device, a question about whether a current temperature is proper; and
    respond to the question.

5. The wearable device of claim 1, wherein, when the air-conditioning control device is not sensed through the short-range communication, the control unit is configured to:
    transmit, to a service server, the temperature measurement information; and receive, from the service server, the service information for controlling the temperature for the user based on location information of the user and temperature information of the user.

6. The wearable device of claim 1, wherein the temperature measurement information comprises at least one of the measured temperature, the external temperature, the temperature difference, or the location information of the user.

7. A service server for controlling a temperature for a user, comprising:
  a communication unit configured to communicate with a wearable device over a communication network; and
  a personalized service unit configured to:
    generate service information for controlling the temperature for the user based on location information of the user and temperature information of the user when the communication unit transmits temperature measurement information comprising the location information of the user and the temperature information of the user;
    provide the service information to the wearable device;
    check stores located in a short distance from the location of the user;
    identify stores that provide a service for controlling the temperature for the user among the checked stores; and
    generate the service information for controlling the temperature for the user, wherein the service information comprises at least one of information regarding food provided by the identified stores, or information regarding a coupon or a rewards point provided by the identified stores.

8. The service server of claim 7, wherein, when an air-conditioning control device is present in the location information, the personalized service unit is configured to:
  transmit, to the wearable device, a question about whether a current temperature of the air-conditioning control device is proper; and
  control a temperature of the air-conditioning control device based on a response from the wearable device.

9. The service server of claim 7, wherein the service server further comprises:
  a database configured to store store-related information comprising at least one of information regarding a store name, information regarding a store location, information regarding a commodity, or information regarding a coupon or a rewards point.

* * * * *